United States Patent
Kilbury et al.

(10) Patent No.: US 12,374,772 B2
(45) Date of Patent: Jul. 29, 2025

(54) USER TERMINAL HOUSING

(71) Applicant: Space Exploration Technologies Corp., Hawthorne, CA (US)

(72) Inventors: Tad A. Kilbury, Long Beach, CA (US); Jackson Shaffner, El Segundo, CA (US); David Milroy, Kirkland, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/983,960

(22) Filed: Nov. 9, 2022

(65) Prior Publication Data

US 2023/0145053 A1    May 11, 2023

Related U.S. Application Data

(60) Provisional application No. 63/277,470, filed on Nov. 9, 2021.

(51) Int. Cl.
*H01Q 1/12* (2006.01)
*F16B 7/04* (2006.01)
*F16M 11/28* (2006.01)
*H01Q 1/42* (2006.01)
*H01Q 3/08* (2006.01)
*H01Q 3/34* (2006.01)

(52) U.S. Cl.
CPC .......... *H01Q 1/1242* (2013.01); *F16B 7/0413* (2013.01); *F16M 11/28* (2013.01); *H01Q 1/422* (2013.01); *H01Q 3/08* (2013.01); *H01Q 3/34* (2013.01)

(58) Field of Classification Search
CPC ........ H01Q 1/1242; H01Q 1/422; H01Q 1/02; H01Q 1/088; H01Q 1/1207; H01Q 1/1214; H01Q 1/246; H01Q 1/42; H01Q 3/08; H01Q 3/34; F16B 7/0413; F16M 11/28

See application file for complete search history.

(56) References Cited

U.S. PATENT DOCUMENTS

| | | |
|---|---|---|
| 4,851,855 A | 7/1989 | Tsukamoto et al. |
| 4,937,585 A | 6/1990 | Shoemaker |
| 5,270,721 A | 12/1993 | Tsukamoto et al. |
| 5,382,959 A | 1/1995 | Pett et al. |

(Continued)

FOREIGN PATENT DOCUMENTS

| | | |
|---|---|---|
| CN | 106558761 A | 4/2017 |
| CN | 109474324 A | 3/2019 |

(Continued)

OTHER PUBLICATIONS

International Search Report and Written Opinion mailed Nov. 30, 2020, issued in International Patent Application No. PCT/US2020/036015, filed Jun. 3, 2020, 19 pages.

(Continued)

*Primary Examiner* — Seokjin Kim
(74) *Attorney, Agent, or Firm* — Polsinelli PC

(57) ABSTRACT

In one example, a housing for an antenna assembly is described. The housing may include a lower enclosure configured to be coupled to an upper structure to define an internal region. The housing may also include an internal cover configured to be coupled to the lower enclosure to create a first chamber and a second chamber within the internal region.

19 Claims, 10 Drawing Sheets

(56) References Cited

U.S. PATENT DOCUMENTS

| | | |
|---|---|---|
| 5,769,104 A | 6/1998 | Uemura |
| 5,796,367 A | 8/1998 | Andersson |
| 5,844,529 A | 12/1998 | Bell et al. |
| 6,107,976 A | 8/2000 | Purinton |
| 6,243,040 B1* | 6/2001 | Corey ................... H01Q 9/0407 343/878 |
| 6,285,323 B1 | 9/2001 | Frank |
| 6,624,787 B2 | 9/2003 | Puzella et al. |
| 6,682,029 B1 | 1/2004 | Dierkes |
| 6,759,995 B1 | 7/2004 | Speece |
| 7,525,507 B1 | 4/2009 | Henry, Jr. |
| 9,116,222 B1 | 8/2015 | Ellsworth |
| 10,658,758 B2 | 5/2020 | Hafenrichter et al. |
| 10,694,637 B1 | 6/2020 | Wolf |
| 11,075,456 B1 | 7/2021 | Hennig et al. |
| 11,355,837 B1* | 6/2022 | Vincenzi ................... H01Q 1/02 |
| 2002/0169578 A1 | 11/2002 | Yang |
| 2003/0078015 A1* | 4/2003 | Laetsch ............. H05K 7/20445 455/90.3 |
| 2004/0047682 A1 | 3/2004 | Stahle et al. |
| 2004/0108423 A1 | 6/2004 | Boaro et al. |
| 2004/0150561 A1 | 8/2004 | Tillery et al. |
| 2004/0169114 A1 | 9/2004 | Dierkes |
| 2007/0228215 A1 | 10/2007 | Hudson et al. |
| 2008/0001841 A1 | 1/2008 | Albernding et al. |
| 2008/0247746 A1 | 10/2008 | Law et al. |
| 2008/0278399 A1 | 11/2008 | Nakajima et al. |
| 2009/0096603 A1 | 4/2009 | Langsweirdt et al. |
| 2009/0231186 A1 | 9/2009 | Barak et al. |
| 2009/0284436 A1 | 11/2009 | McCarthy et al. |
| 2010/0073257 A1 | 3/2010 | Sherwood et al. |
| 2010/0177012 A1 | 7/2010 | Morrow |
| 2010/0225563 A1 | 9/2010 | Lin et al. |
| 2010/0284737 A1 | 11/2010 | McPheeters |
| 2011/0171901 A1 | 7/2011 | Wyler |
| 2011/0221626 A1 | 9/2011 | Hill |
| 2011/0241932 A1* | 10/2011 | Rowe ...................... H01Q 1/42 342/175 |
| 2013/0284864 A1 | 10/2013 | Vandegrift et al. |
| 2014/0118196 A1 | 5/2014 | Koskiniemi |
| 2014/0022798 A1 | 8/2014 | Sanford |
| 2015/0015453 A1 | 1/2015 | Puzella et al. |
| 2015/0194722 A1 | 7/2015 | Chinn |
| 2015/0250022 A1 | 9/2015 | Kim et al. |
| 2016/0268669 A1 | 9/2016 | Wilcox |
| 2017/0093026 A1 | 3/2017 | Anderson et al. |
| 2017/0105315 A1 | 4/2017 | Huang |
| 2017/0187100 A1 | 6/2017 | Fotheringham |
| 2017/0373387 A1 | 12/2017 | Ohlsson et al. |
| 2018/0083365 A1 | 3/2018 | Hinman et al. |
| 2018/0090851 A1 | 3/2018 | Feldman et al. |
| 2018/0090852 A1 | 3/2018 | Dufilie et al. |
| 2018/0159201 A1 | 6/2018 | Woodling et al. |
| 2018/0358710 A1 | 12/2018 | Toyao et al. |
| 2018/0366820 A1 | 12/2018 | Emerick et al. |
| 2019/0181946 A1 | 6/2019 | Wendling |
| 2019/0296428 A1 | 9/2019 | Hashimoto |
| 2019/0339037 A1 | 11/2019 | Burton |
| 2020/0137888 A1 | 4/2020 | Liu et al. |
| 2020/0321694 A1 | 10/2020 | Harrer |
| 2020/0365999 A1 | 11/2020 | Edenfield et al. |
| 2021/0044008 A1 | 2/2021 | Mathieu |
| 2021/0057796 A1 | 2/2021 | Xu et al. |
| 2021/0265764 A1 | 8/2021 | Hachadorian |
| 2021/0305684 A1* | 9/2021 | Hou ...................... H01Q 23/00 |
| 2021/0313665 A1* | 10/2021 | Hoganson ................ H01Q 1/02 |
| 2021/0384606 A1* | 12/2021 | Kaistha .................. H01Q 1/246 |
| 2021/0399402 A1* | 12/2021 | Chou ................... H01Q 1/1264 |
| 2022/0013895 A1* | 1/2022 | Nagase .................... H01Q 3/36 |

FOREIGN PATENT DOCUMENTS

| | | |
|---|---|---|
| EP | 2159878 A1 | 3/2020 |
| EP | 3734322 A1 | 4/2020 |
| EP | 3712640 A1 | 9/2020 |
| GB | 2458663 A | 9/2009 |
| WO | 00/62371 A2 | 10/2000 |
| WO | 2006019290 A1 | 2/2006 |
| WO | 2009037716 A2 | 3/2009 |
| WO | 2014/124471 A1 | 8/2014 |

OTHER PUBLICATIONS

International Search Report and Written Opinion, dated Sep. 29, 2020, for International Application No. PCT/US2020/036003 (10 pages).

\* cited by examiner

USER TERMINAL HOUSING

CROSS-REFERENCE TO RELATED APPLICATION

This application claims the benefit of U.S. Provisional Application No. 63/277,470, filed Nov. 9, 2021, the disclosure of which is hereby expressly incorporated by reference herein in its entirety.

FIELD

The present disclosure pertains to antenna apparatuses for satellite communication systems.

BACKGROUND

Satellite communication systems generally involve Earth-based antennas in communication with a constellation of satellites in orbit. Earth-based antennas are, of consequence, exposed to weather and other environmental conditions. Some such antennas may include a housing system for protecting electronics from the weather and other conditions. Such antennas may also include mounting systems that facilitate connection and mounting of the antenna at an earth-based location. Described herein are systems for housing and mounting an antenna apparatus which may be used, for example, in satellite communication systems.

SUMMARY

In accordance with one embodiment of the present disclosure, a housing for an antenna assembly is described. The housing may include a lower enclosure configured to be coupled to an upper structure to define an internal region; and an internal cover configured to be coupled to the lower enclosure to create a first chamber and a second chamber within the internal region.

In accordance with one embodiment of the present disclosure, a housing for an antenna assembly is described. The housing may include an upper structure; a lower enclosure configured to be coupled to the upper structure to define an internal region; and an internal cover configured to be coupled to the lower enclosure to create a first chamber and a second chamber within the internal region.

In accordance with one embodiment of the present disclosure, an internal cover for use with an antenna assembly is described. The internal cover may include a perimeter portion configured to be coupled to a lower enclosure to divide an internal region into a first chamber and a second chamber; and a fluid channel extending from the second chamber to the first chamber and configured to resist liquid fluid flow from the first chamber to the second chamber in all orientations of the housing, the fluid channel including an elongated finger defined by the internal cover and extending away from the upper structure.

In accordance with one embodiment of the present disclosure, a system for use with an antenna assembly is described. The system may include a mast having a first end configured to be coupled to a mount and a second end configured to be coupled to the antenna assembly; a bulkhead connector disposed within an inner bore of the mast, wherein the bulkhead connector includes a biasing member moveable between a first position and a second position, wherein the biasing member is biased to the first position and moveable to the second position when urged by a force; and a mount including a mount connector configured to mate with the bulkhead connector, wherein the bulkhead connector is in the first position when mated or unmated with the mount connector, and wherein the bulkhead connector is in the second position when being partially mated or being partially unmated from the mount connector.

In accordance with one embodiments of the present disclosure, a bulkhead connector for use with a mounting system of an antenna assembly is described. The bulkhead connector may include a body having a first end and a second end, the first end configured to be received within the inner bore of a mast and the second end configured to be received by an opening of a mount; and a biasing member coupled to the body and moveable between a first position and a second position relative to the body, wherein the biasing member is biased to the first position and moveable to the second position when urged by a force, wherein the bulkhead connector is in the first position when mated or unmated with the mount, and wherein the bulkhead connector is in the second position when being partially mated or being partially unmated from the mount.

In any of the embodiments described herein, the lower enclosure may define a leg opening configured to receive a leg of a mounting system of the housing, and the leg opening may be located within the first chamber.

In any of the embodiments described herein, the internal cover may hermetically seal the first chamber from the second chamber.

In any of the embodiments described herein, the housing may further include an actuator configured to be located in the first chamber and to be coupled to the leg, and further configured to actuate in order to adjust an orientation of the housing relative to the leg.

In any of the embodiments described herein, the housing may further include a dust cover configured to be positioned over the leg opening and to be coupled to the leg, and further configured to reduce the likelihood of ingress of debris into the first chamber.

In any of the embodiments described herein, the internal cover may be sealed to the lower enclosure.

In any of the embodiments described herein, the second chamber may be configured to house at least one antenna element.

In any of the embodiments described herein, the internal cover may further include a fluid channel extending from the second chamber to the first chamber, and wherein the fluid channel may be configured to resist liquid fluid flow from the first chamber to the second chamber in all orientations of the housing.

In any of the embodiments described herein, the fluid channel may include an elongated finger defined by the internal cover and extending away from the upper structure.

In any of the embodiments described herein, the lower enclosure may define drain holes extending from an environment of the lower enclosure into the first chamber.

In any of the embodiments described herein, when the housing is in an inverted position, a distal end of the elongated finger may define an outlet that is located at a height above the drain holes such that liquid fluid entering the first chamber exits the first chamber via the drain holes rather than flowing through the elongated finger into the second chamber.

In any of the embodiments described herein, the fluid channel may allow for air circulation between the first chamber and the second chamber.

In any of the embodiments described herein, the housing may further include at least one grommet defining a pathway between the first chamber and the second chamber for at least one cable to pass between the first chamber and the second chamber.

In any of the embodiments described herein, the housing may be configured to house a phased array antenna.

In any of the embodiments described herein, the second chamber may be configured to house at least one antenna element, the internal cover further may include a fluid channel extending from the second chamber to the first chamber, and the fluid channel may be configured to resist liquid fluid flow from the first chamber to the second chamber in all orientations of the housing.

In any of the embodiments described herein, the lower enclosure may define drain holes extending from an environment of the lower enclosure into the first chamber, and wherein, when the housing is in an inverted position, a distal end of the elongated finger defines an outlet that is located at a height above the drain holes such that fluid entering the first chamber exits the first chamber via the drain holes rather than flowing through the elongated finger into the second chamber.

In any of the embodiments described herein, the mount connector may include an opening configured to receive the mast.

In any of the embodiments described herein, the mast may define a coupling portion configured to be received by the opening defined by the mount connector.

In any of the embodiments described herein, the coupling portion of the mast may define a slot to allow flexure in the mast to facilitate an interference fit between the coupling portion of the mast and the opening of the mount connector.

In any of the embodiments described herein, a longitudinal axis of the slot may extend substantially parallel to a longitudinal axis of the mast.

In any of the embodiments described herein, the system may further include a first electrical connector disposed within the inner bore of the mast and configured to be coupled to the antenna assembly.

In any of the embodiments described herein, the first electrical connector may be configured to receive a second electrical connector coupled to an external cable.

In any of the embodiments described herein, the second electrical connector may be retained between the mast and the mount in response to the mast and the bulkhead connector being coupled to the mount and the biasing member being in the first position.

In any of the embodiments described herein, the first electrical connector may be disposed on a first side of the inner bore of the mast, and wherein the biasing member may be disposed on a second side of the inner bore of the mast.

In any of the embodiments described herein, the biasing member may be moveable to the second position by depressing a biasing interface.

In any of the embodiments described herein, the biasing member may further include a bulkhead tab configured to be received by a mount receiver defined by the mount.

In any of the embodiments described herein, the bulkhead tab may actuate in response to depression of the biasing interface of the biasing member.

In any of the embodiments described herein, the biasing member may include a spring to bias the biasing member to the first position.

In any of the embodiments described herein, the biasing interface and the bulkhead tab may both be attached to the spring.

In any of the embodiments described herein, the spring may include a stopping interface to prevent over biasing.

DETAILED DESCRIPTION

Figure 1:
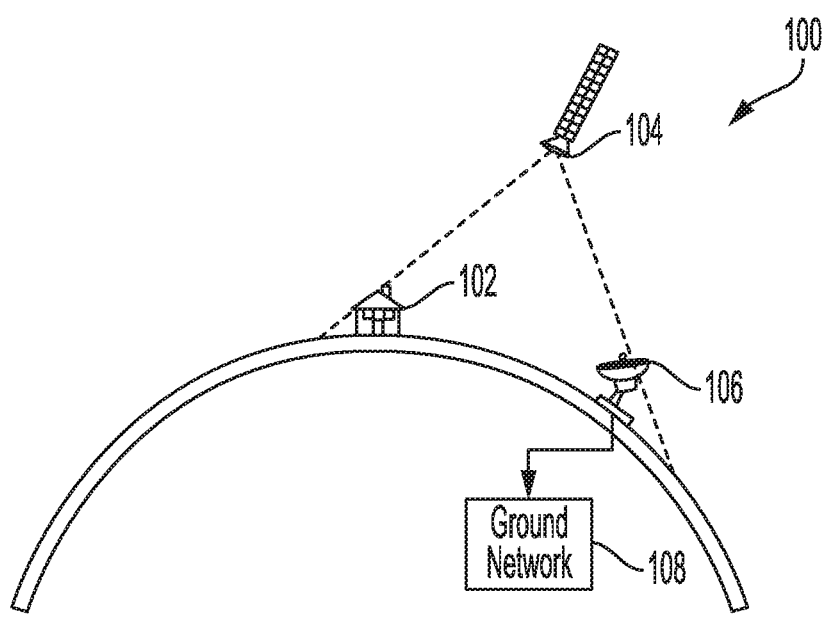
FIG. 1 is a not-to-scale diagram illustrating a simple example of communication in a satellite communication system in accordance with embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as "top", "bottom", "upper", "lower", "vertical", "horizontal", "lateral", in the present disclosure is meant to provide orientation for the reader with reference to the drawings and is not intended to be the required orientation of the components or to impart orientation limitations into the claims.

Embodiments of the present disclosure are directed to systems and methods for housing, assembling, and mounting antenna apparatuses which include antenna systems designed for sending and/or receiving radio frequency signals to and/or from a satellite or a constellation of satellites.

The antenna systems of the present disclosure may be employed in communication systems providing relatively high-bandwidth, low-latency network communication via a constellation of satellites. Such constellation of satellites may be in a non-geosynchronous Earth orbit (GEO), such as a low Earth orbit (LEO). FIG. 1 illustrates a not-to-scale embodiment of an antenna and satellite communication system 100 in which embodiments of the present disclosure may be implemented. As shown in FIG. 1, an Earth-based endpoint or user terminal 102 is installed at a location directly or indirectly on the Earth's surface such as house or other building, tower, a vehicle (e.g., land-based vehicle, watercraft, aircraft, spacecraft, or the like), or another location where it is desired to obtain communication access via a network of satellites. An Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a geographically stationary or substantially stationary object, such as a platform or a balloon.

A communication path may be established between the endpoint terminal 102 and a satellite 104. In the illustrated embodiment, the first satellite 104, in turn, establishes a communication path with a gateway terminal 106. In another embodiment, the satellite 104 may establish a communication path with another satellite prior to communication with a gateway terminal 106. The gateway terminal 106 may be physically connected via fiber optic, Ethernet, or another physical connection to a ground network 108. The ground network 108 may be any type of network, including the Internet. While one satellite 104 is illustrated, communication may be with and between any one or more satellite of a constellation of satellites.

Figure 2A:
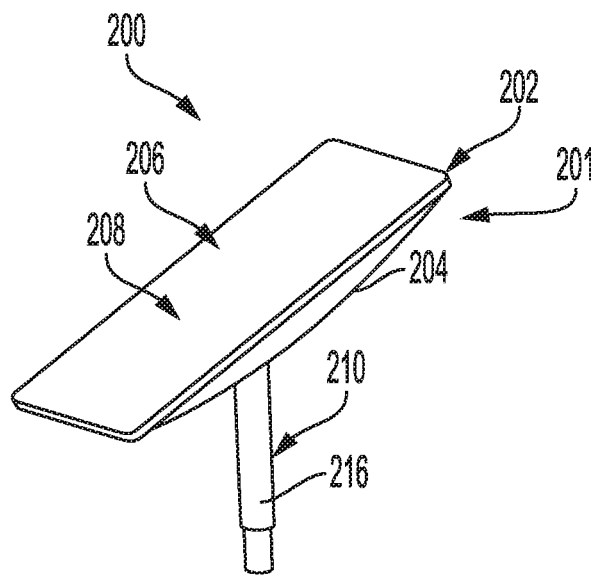
FIG. 2A is an isometric top view depicting an exemplary antenna apparatus in accordance with embodiments of the present disclosure.
Figure 2B:
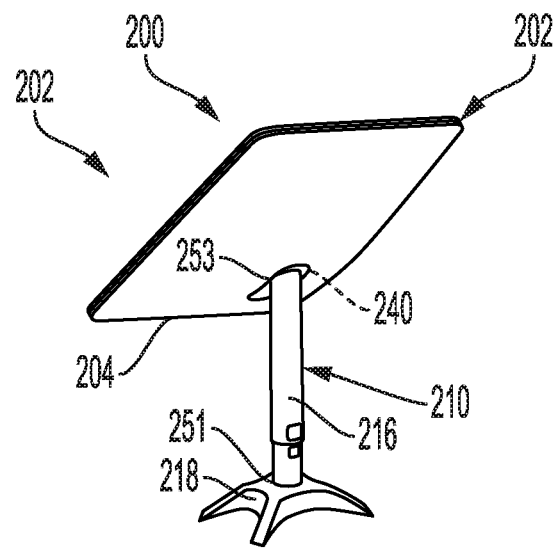
FIG. 2B is an isometric bottom view depicting exemplary antenna apparatus of FIG. 2A, showing a housing secured to a leg that is designed to be mounted to a surface in accordance with embodiments of the present disclosure.

The endpoint or user terminal 102 may include an antenna apparatus 200, for example, as illustrated in FIGS. 2A and 2B. As shown, the antenna apparatus 200 may include a housing assembly 202, which includes a radome portion 206 and a lower enclosure 204 that couples to the radome portion 206. An antenna system and other electronic components, as described below, are disposed within the housing assembly 202. In accordance with embodiments of the present disclosure, the antenna apparatus 200 and its housing assembly 202 may include materials for durability and reliability in an outdoor environment as well as facilitating the sending and/or receiving radio frequency signals to and/or from a satellite or a constellation of satellites with the satellites 104.

FIG. 2B illustrates a perspective view of an underside of the antenna apparatus 200. As shown, the antenna apparatus 200 may include a lower enclosure 204 that couples to the radome portion 206 to define the housing assembly 202. In the illustrated embodiment, the mounting system 210 includes a mast 216 (such as a leg) and a mount 218. The mast 216 may be formed from any material such as a polymer, a fiber-reinforced polymer, a metal, or the like. Similarly, the mount 218 may be formed from any material such as a polymer, a fiber-reinforced polymer, a metal, or the like.

The mount 218 may be securable to a surface such as via at least one of a fastener (e.g., screw threading, snap-fit connector, bolts and nuts, and the like), an adhesive, and the like. In some embodiments, the mount 218 may be designed to rest upon a surface without additional security such as by resting on a set of legs. In some embodiments, the mount 218 may be designed to receive a bottom portion of the mast 216. The mast 216, shown as a single mounting leg, may be defined by a generally hollow cylindrical or tubular body, although other shapes may be suitably employed. With a hollow configuration, any necessary wiring or electrical connections may extend into and within the interior of the mast 216 up into the housing assembly 202 of the antenna apparatus 200. The mast 216 may include a first end 251 designed to be coupled to the mount 218, and a second end 253 designed to be coupled to the housing assembly 202.

A tilting mechanism, or actuator 240 (see FIG. 3A, details not shown), may be disposed within the lower enclosure 204 and may permit a degree of tilting to point the face of the radome portion 206 at a variety of angles for optimized communication and for rain and snow run-off. Such tilting may be automatic or manual. In some embodiments, the actuator 240 may be coupled to the second end 253 of the mast 216.

Returning to FIG. 1, the antenna apparatus 200 may be configured to be mounted on a mounting surface for an unimpeded view of the sky. As not limiting examples, the antenna apparatus 200 may be mounted at an Earth-based fixed position, for example, the roof or wall of a building, a tower, a natural structure, a ground surface, an atmospheric platform or balloon, or on a moving vehicle, such as a land vehicle, airplane, or boat, or to any other appropriate mounting surface having an unimpeded or partially unimpeded view of the sky for communications with at least one satellite.

In various embodiments, the antenna apparatus 200 includes an antenna system designed for sending and/or receiving radio frequency signals to and/or from a satellite or a constellation of satellites. The antenna system, as described below, is disposed in the housing assembly 202 and may include an antenna aperture 208 (see FIG. 2A) defining an area for transmitting and receiving signals, such as a phased array antenna system or another antenna system. Besides the antenna aperture 208, the antenna apparatus 200 may include other electronic components within the housing assembly 202, for example, which may include, but are not limited to beamformers, a modem, a Wifi card and/or Wifi antennas, a GPS antenna, as well as other components.

Figure 3A:
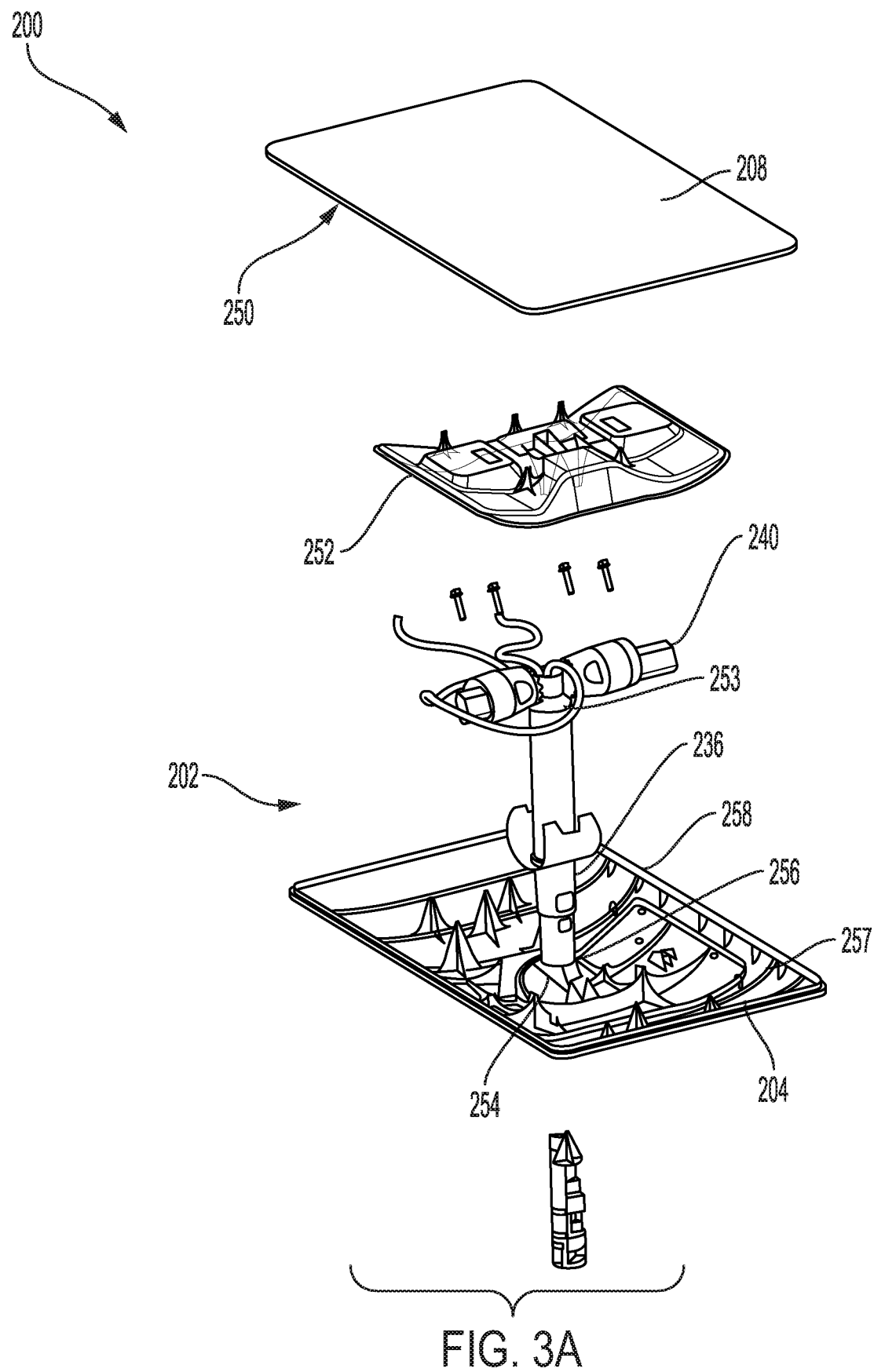
FIG. 3A is an isometric exploded view depicting a housing assembly of the antenna assembly of FIGS. 2A and 2B in accordance with embodiments of the present disclosure.

Turning to FIG. 3A, the antenna apparatus 200 may include an antenna stack 250, an internal cover 252, a lower enclosure 204, and a tilting mechanism 240 coupled to a mast 216. Components of the antenna apparatus 200 may form a housing assembly 202. For example, the housing assembly 202 may include the lower enclosure 204, the internal cover 252, and a portion of the antenna stack 250. In some embodiments, the housing assembly 202 may include any upper structure in place of the antenna stack 250 such as an upper enclosure that mates with the lower enclosure 204, a radome separated from the antenna stack 250, or the like. In that regard, the antenna stack 250 or a portion thereof may be referred to as an upper structure as it mates with the lower enclosure 204 to form a housing assembly 202. The mast 216 (e.g., the second end 253 of the mast 216) may extend through an opening 254 defined by the lower enclosure 204 (e.g., a leg opening 254) and may couple to the tilting mechanism or actuator 240. In some embodiments, the second end 253 of the mast 216 may be coupled to the actuator 240.

An internal region 258 may be defined between the antenna stack 250 and the lower enclosure 204. The internal cover 252 may be coupled to the lower enclosure within the internal region 258 between the antenna stack 250 and the lower enclosure 204, splitting the internal region 258 into a first chamber 256 between the internal cover 252 and the lower enclosure 204 (see FIG. 4C) and a second chamber 257 between the internal cover 252 and the antenna stack 250 (see FIG. 4A). The coupling between the internal cover 252 and the lower enclosure 204 may be waterproof or water resistant (e.g., the internal cover 252 may be hermetically sealed to the lower enclosure 204), and the opening 254 may be defined within the first chamber 256. In that regard, any debris or moisture that enters the first chamber 256 via the opening 254 may remain within the first chamber 256, reducing the likelihood of such debris or moisture reaching the second chamber 257 (including the antenna stack 250).

The tilting mechanism 240 may be coupled to at least one of the lower enclosure 204 and the internal cover 252 such that rotation of the tilting mechanism 240 relative to the mast 216 results in rotation of the antenna stack 250 relative to the mast 216. Such rotation may be used to physically readjust the pointing direction of the antenna aperture 208.

Figure 3B:
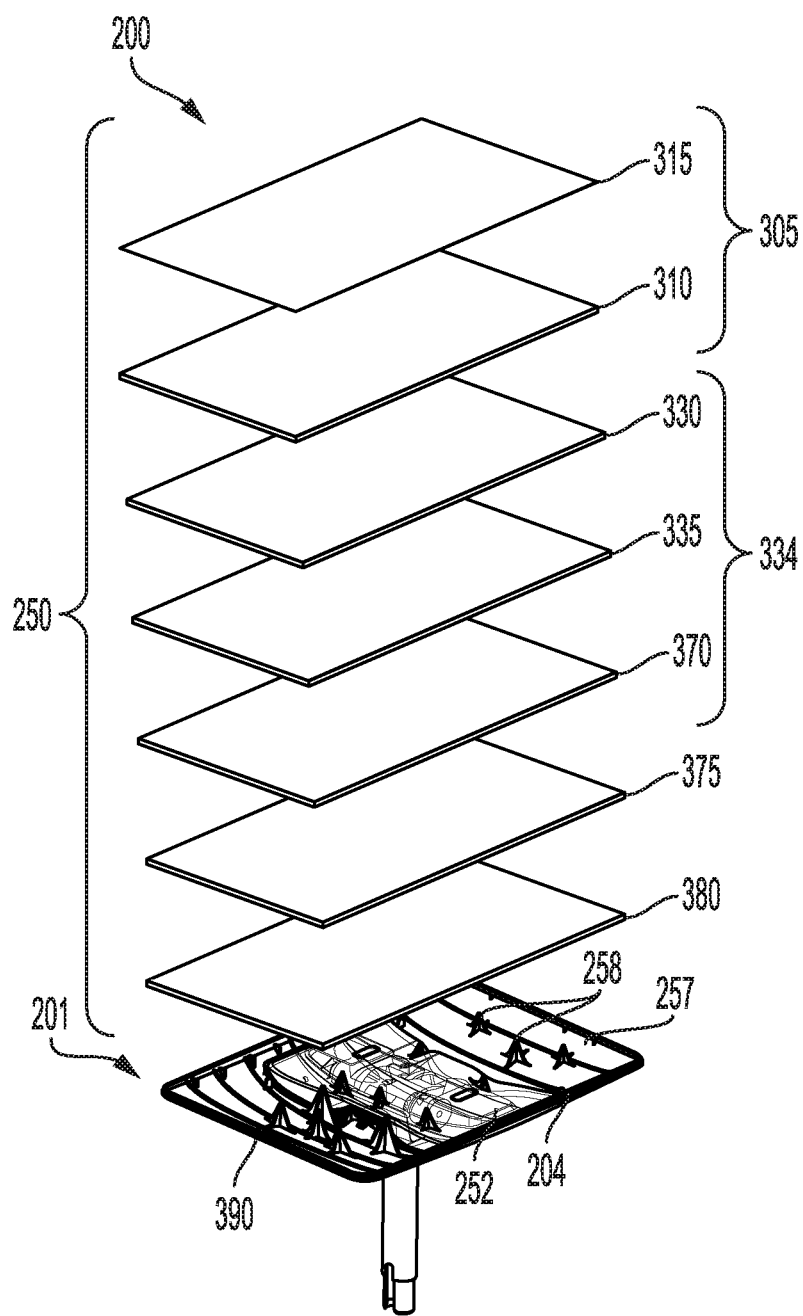
FIG. 3B is an isometric exploded view depicting various elements of an antenna stack of the antenna assembly of FIGS. 2A and 2B in accordance with embodiments of the present disclosure.

FIG. 3B illustrates an exploded view of the antenna stack 250, showing various layers of the antenna stack 250. For example, the antenna stack 250 may include a radome assembly 305 which may include a radome body assembly 310 and an outer layer 315. The antenna stack 250 may further include a patch antenna assembly 334 that includes an upper patch antenna layer 330, an antenna spacer 335, and a lower patch antenna layer 370 which together form a plurality of patch antennas forming an antenna array. The antenna stack 250 may also include a dielectric layer 375 and a printed circuit board (PCB) assembly 380. As will be discussed further below, the various layers of the antenna stack 250 may be at least partially mechanically and electrically coupled together.

As shown, the layers of the antenna stack 250 may be rectangular in shape. That is, each of the radome assembly 305, patch antenna assembly 334, dielectric layer 375, and PCB assembly 380 may have a rectangular shape when viewed from above or below (i.e., along a stacking axis of the antenna stack 250). However, one skilled in the art will realize that the shape of the antenna stack 250 (and all elements therein) may have any shape such as rectangular, square, circular, oval, square, and the like, and may have any additional features such as rounded corners, sharp corners, and the like. As shown each element of the antenna stack 250 may have similar lengths and widths (as well as the lower enclosure 204). The radome assembly 305 may have a slightly greater length and a slightly greater width than the remaining elements of the antenna stack 250 to facilitate coupling of the radome assembly 305 to the lower enclosure 204 in such a manner to cause the remaining elements of the antenna stack 250 to remain wholly enclosed within the internal region 258. However, one skilled in the art will realize that the various layers may have different dimensions.

The coupling of the radome assembly 305 (or any other upper structure, such as an upper enclosure) to the lower enclosure 204 may be performed in such a way as to form a hermetic seal between the two. As a non-limiting example, in some embodiments, vibration, ultrasonic, or other welding may be used to couple the radome body assembly 310 to the lower enclosure 204.

Vibration welding refers to a process in which two workpieces (e.g., the radome body assembly 310 and the lower enclosure 204) are brought into contact under pressure, and a reciprocating motion (e.g., vibration) is applied along the common interface (e.g., the interface between the radome body assembly 310 and the lower enclosure 204) to generate heat. The resulting heat melts the workpieces, and they become welded when the vibration stops and the interface cools. The vibration may be achieved either through linear vibration welding, which uses a one-dimensional back-and-forth motion, or orbital vibration welding, which moves the pieces in small orbits relative to each other. The vibrations may operate at a frequency between 120 hertz and 360 hertz, between 200 hertz and 280 hertz, between 220 hertz and 260 hertz, about 240 hertz, or the like. The amplitude of the vibration may be, for example, between 20 mil and 118 mil (0.5 mm and 3 mm), between 40 mil and 78 mil (1 mm and 2 mm), or about 59 mil (1.5 mm).

Ultrasonic welding is a process in which high-frequency (e.g., between 20 kilohertz and 40 kilohertz) ultrasonic acoustic vibrations are locally applied to workpieces (e.g., the radome body assembly 310 and the lower enclosure 204)

being held together under pressure to create a solid-state weld. Ultrasonic welding may be particularly useful when the two workpieces are formed using dissimilar materials (e.g., a polymer for one and a metal for the other).

The weld between the radome body assembly 310 and the lower enclosure 204 may result in a hermetic seal formed around the entire interface between the two elements. That is, the weld may resist water ingress across the seal between the radome body assembly 310 and the lower enclosure 204. Vibration or ultrasonic welding may be optimally performed using thermoplastics. In that regard and in some embodiments, the radome body assembly 310 and the lower enclosure 204 may include a thermoplastic (at least at the respective portions thereof). In some embodiments, one or both of the radome body assembly 310 and the lower enclosure 204 may include a different material. For example, the radome body assembly 310 may include a thermoplastic and the lower enclosure 204 may include a non-thermoplastic polymer or a metal. In some embodiments, both the radome body assembly 310 and the lower enclosure 204 may include a non-thermoplastic polymer or a metal.

Furthermore, as referenced above, the lower enclosure 204 may be coupled to a radome that is separated from the antenna stack 250 to form the internal region 258, the lower enclosure 204 may be coupled to an upper enclosure to form the internal region 258, or the lower enclosure may couple to any additional or alternative upper structure to form the internal region 258. Such coupling may likewise form a hermetic seal between the lower enclosure 204 and the upper structure.

Internal Cover

Figure 4A:
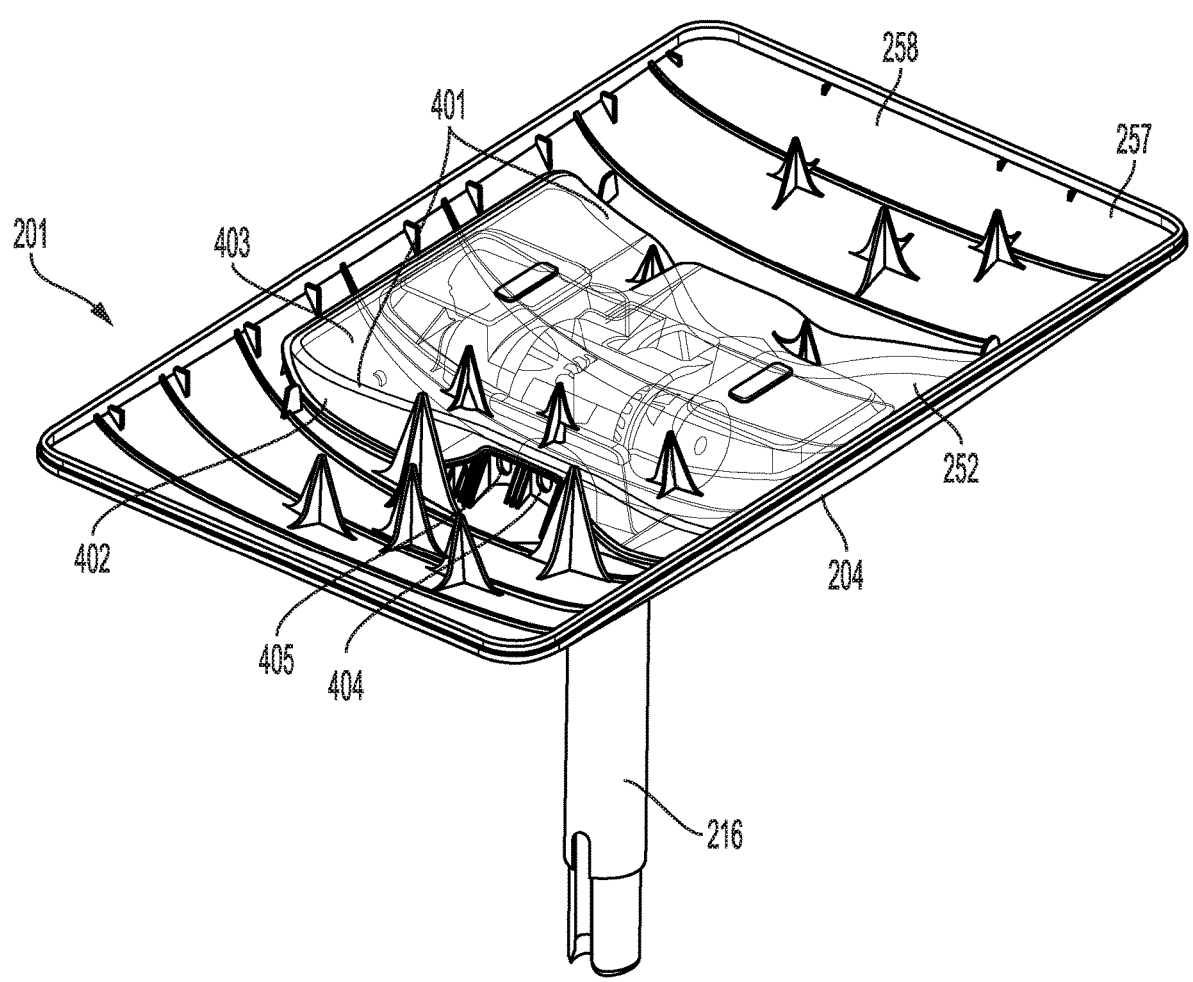
FIG. 4A is a perspective view of an internal cavity of the housing assembly of the antenna assembly of FIGS. 2A and 2B illustrating use of an internal cover within the housing assembly in accordance with embodiments of the present disclosure.
Figure 4B:
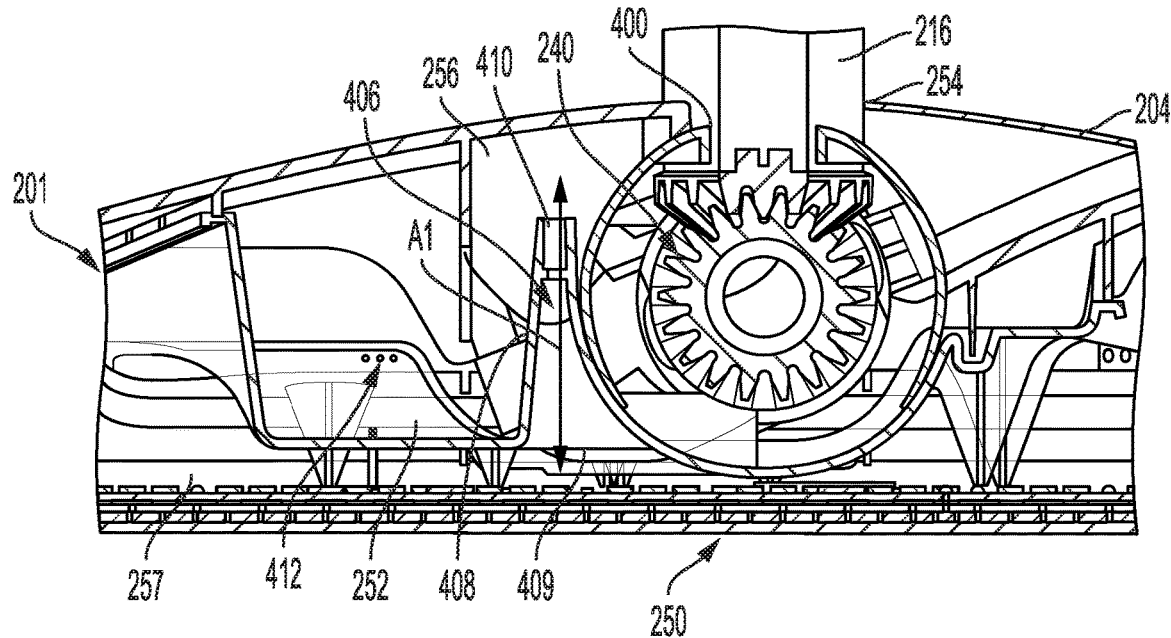
FIG. 4B is a cross-sectional view of the antenna assembly of FIGS. 2A and 2B in an inverted state illustrating features of the housing assembly and internal cover of FIG. 4A in accordance with embodiments of the present disclosure.
Figure 4C:
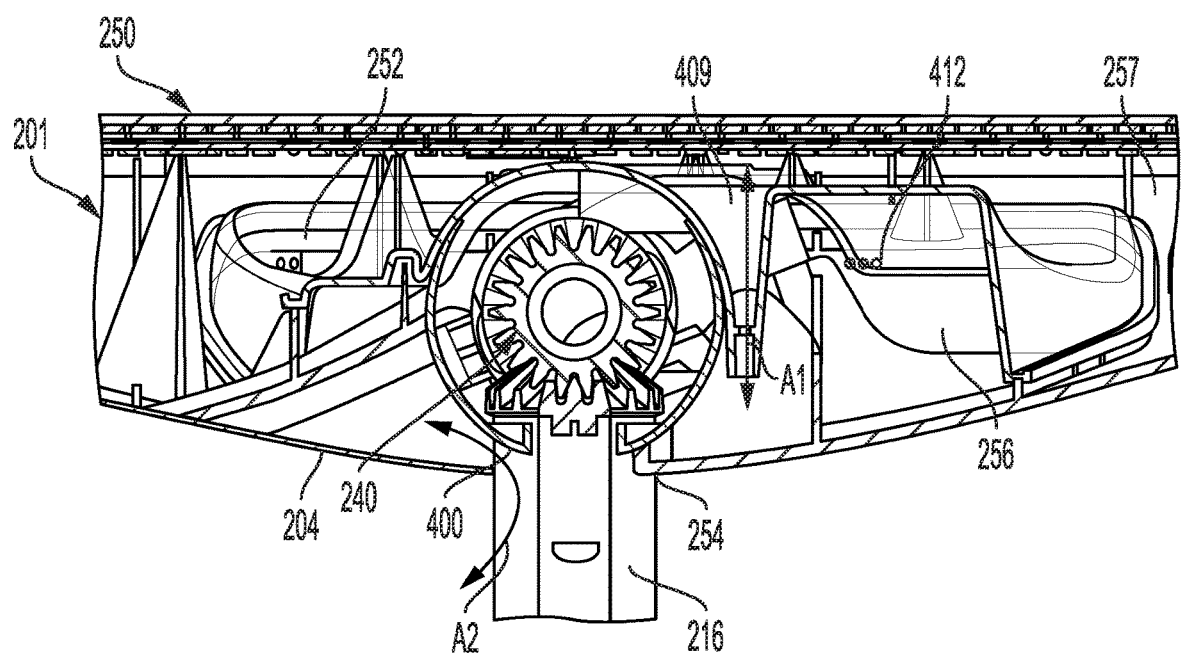
FIG. 4C is a cross-sectional view of the antenna assembly of FIGS. 2A and 2B in an upright state illustrating features of the housing assembly and internal cover of FIG. 4A in accordance with embodiments of the present disclosure.

Turning to FIGS. 4A, 4B, and 4C, additional details regarding the housing assembly 202 is shown. As shown, the lower enclosure 204 defines an opening 254 through which the mast 216 may extend. The mast 216 may be coupled to the actuator, or tilting mechanism, 240. The tilting mechanism 240 may be coupled to at least one of the lower enclosure 204 or the mast 216 and may actuate to adjust an angle between the lower enclosure 204 and the mast 216. In that regard, actuation of the actuator 240 may adjust an orientation of the antenna aperture 208 relative to the sky in order to redirect the pointing direction of the antenna aperture 208. The opening 254 may be sufficiently large to allow this tilting of the lower enclosure 204 relative to the mast 216. Stated differently, the opening 254 may be sufficiently large to allow the mast 216 to move relative to the lower enclosure 204. The opening 254 may have any shape such as a circle, an oval, a square, a rectangle, or any other shape. Similarly, the opening 254 may have sharp edges, rounded edges, no edges, or the like.

The housing assembly 202 may further include a dust cover 400 (see FIGS. 4B and 4C) coupled to at least one of the lower enclosure 204 or the mast 216. The dust cover 400 may at least partially fill the opening 254 in order to reduce the likelihood of debris ingress into the internal region 258. In some embodiments, the dust cover 400 may be coupled to the mast 216 and may move with the mast 216 relative to the lower enclosure 204. In that regard, the dust cover 400 may cover parts of the opening 254 which would otherwise be exposed (e.g., parts of the opening 254 other than those which the mast 216 is located). The dust cover 400 may be formed from any material, such as a sheet of polymer, metal, or cloth, and may have any shape. For example, the dust cover 400 may resemble a square, circle, rectangle, oval, or any other shape. The dust cover 400 may be sufficiently large so as to cover the opening 254 regardless of the location of the mast 216 relative to the opening 254. The dust cover 400 may be sufficiently flush with the lower enclosure 204 so as to reduce the likelihood of ingress of debris but may be sufficiently loose so as to allow air to flow between the ambient environment and the first chamber 256 of the internal region 258.

Referring to FIG. 4A, the internal cover 252 may have a perimeter portion 402 extending around a perimeter thereof. The perimeter portion 402 may be designed to rest flush with an inner surface of the lower enclosure 204 when the internal cover 252 is aligned with the lower enclosure 204. In that regard, the perimeter portion 402 of the internal cover 252 is designed to be coupled to the inner surface of the lower enclosure 204 to separate the internal region 258 into the first chamber 256 and the second chamber 257. The coupling of the internal cover 252 to the lower enclosure 204 may be performed in such a way as to form a hermetic seal between the two. In that regard, the actuator 240 may be located in the first chamber 256, and the antenna stack 250 may be partially or entirely located in the second chamber 257. Due to the relatively sensitive components of the antenna stack 250, it may be desirable to reduce or eliminate the ingress of debris or moisture into the second chamber 257.

The internal cover 252 may be centrally located relative to the lower enclosure 204. That is, the internal cover 252 may be coupled to a location on the lower enclosure 204 that is located at a center of the lower enclosure 204 (i.e., generally equidistant from opposing ends of the lower enclosure 204). In some embodiments, the internal cover 252 may cover a portion or all of the inner surface of the lower enclosure 204. For example, the internal cover 252 may cover (e.g., enclose within the first chamber 256) only 25 percent of the lower enclosure 204, 50 percent of the lower enclosure 204, 75 percent of the lower enclosure 204, 100 percent of the lower enclosure 204, or the like. As shown, at least a portion of the lower enclosure 204 may have a curve. Stated differently, the lower enclosure 204 may bow towards the opening 254. In that regard, the perimeter portion 402 of the internal cover 252 may be designed to rest flush against the lower enclosure 204 regardless of the curvature or other features of the lower enclosure 204. In that regard, the internal cover 252 may include walls 401 that extend outward from a body portion 403 of the internal cover 252 (see FIG. 4A). The walls 401 may have a variable length in order to compensate for curvature or other geometries of the lower enclosure 204. In some embodiments, the body portion 403 may have a planar or any other shape, and the walls 401 may extend outward (i.e., towards the lower enclosure 204) from a perimeter of the plane of the body portion 403. The walls 401 may form any curvature or angle relative to the body portion 403 and may have any shape or combination of shapes. The perimeter portion 402 may include an outer edge of the walls 401 (e.g., edges of the walls 401 that are spaced apart from the body portion 403).

The coupling of the internal cover 252 to the lower enclosure 204 may be performed in such a way as to form a hermetic seal between the two. As a non-limiting example, in some embodiments, vibration or ultrasonic welding may be used to couple the internal cover 252 to the lower enclosure 204. Other joining techniques may include adhesives, heat melting, and other suitable techniques for forming a seal.

The coupling between the internal cover 252 and the lower enclosure 204 may result in a hermetic seal formed around the entire interface between the two elements. That is, the coupling may resist water ingress across the seal between the internal cover 252 and the lower enclosure 204. Vibration or ultrasonic welding may be optimally performed using thermoplastics. In that regard and in some embodiments, at least one of the internal cover 252 and the lower enclosure 204 may include a thermoplastic (at least at the respective portions or interfaces thereof). In some embodiments, one or both of the internal cover 252 and the lower enclosure 204 may include a different material. For example, the internal cover 252 may include a thermoplastic and the lower enclosure 204 may include a non-thermoplastic polymer or a metal. In some embodiments, both the internal cover 252 and the lower enclosure 204 may include a non-thermoplastic polymer or a metal.

In some embodiments, one or both of the internal cover 252 and the lower enclosure 204 may be constructed of a fiberglass base for mechanical strength. The fiberglass may be laminated with a polymer or copolymer of polyethylene, which may be functionalized with fluorine and/or chlorine. The laminate may be a fluorinated polymer (fluoro polymer), such as polytetrafluoroethylene (PTFE) or a copolymer of ethylene and chlorotrifluoethylene, such as ethylene chlorotrifluoroethylene (ECTFE).

In some embodiments, at least one of the internal cover 252 and the lower enclosure 204 may be another type of high-pressure thermoset plastic laminate grade, or a composite, such as fiberglass composite, quartz glass composite, Kevlar composite, or a panel material, such as polycarbonate.

In some embodiments of the present disclosure, at least one of the internal cover 252 and the lower enclosure 204 may be a lay-up made from a first layer made from fibrous material, such as fiberglass or Kevlar fibers, pre-impregnated with a resin, such as an epoxy or polyethylene terephthalate (PET) resin.

In some embodiments, at least one of the internal cover 252 and the lower enclosure 204 may be formed from a plastic with a plurality of fibers located throughout. For example, the fibers may include fiberglass, Kevlar fibers, carbon fibers, or the like.

As referenced above, the internal cover 252 may be hermetically sealed to the lower enclosure 204. However, it may be desirable for cables, wires, or other electronic communication means to extend from the first chamber 256 to the second chamber 257, for example, to port power or data signals therebetween. For example, at least one of a power signal and a data signal may be received via a cable that extends through the mast 216. The cable may extend through the mast 216 into the first chamber 256. It may be desirable for at least one of the power signal and the data signal to reach the antenna stack 250. In that regard, at least one of the internal cover 252 and the lower enclosure may include or define a grommet 404 forming a pathway 405 for a cable or wire to pass through in order to port such electrical signals. For example, the grommet 404 may be formed in or defined by the internal cover 252, may be formed in or defined by the lower enclosure 204, may be partially formed in both the internal cover 252 and the lower enclosure 204 (such as a junction therebetween), or the like. In some embodiments, the grommet 404 may be replaced with any additional or alternative pathway. For example, a cable may extend through an opening and a potting material may be added to the opening to seal the opening. In some embodiments, any quantity of grommets 404 and alternative pathways may be utilized based on a quantity of cables or wires are desired to pass through the internal cover 252.

After the desired cable, cables, wire, or wires are passed through the pathway 405 of the grommet 404, the grommet 404 may be pinched off to re-seal the first chamber 256 from the second chamber 257. The grommet 404 may be sealed about the cable(s) or wire(s) in any known method such as tightening the grommet 404 about the cable(s) or wire(s), filling the grommet 404 with a sealant about the cable(s) or wire(s), or the like.

It may be desirable for a vent to exist between the first chamber 256 and the second chamber 257 to facilitate pressure equalization therebetween. Otherwise, changes in at least one of temperature or environmental pressure may pressurize the second chamber 257 relative to the first chamber 256 (the first chamber 256 may equalize in pressure with the ambient environment due to passage of air through the opening 254). Such pressure may undesirably damage a portion of the antenna stack 250. In that regard, a fluid channel 406 may exist between the first chamber 256 and the second chamber 257 (see FIGS. 4B and 4C). The fluid channel 406 may be designed to provide various functions. For example, the fluid channel 406 may be designed to facilitate air pressure equalization between the first chamber 256 and the second chamber 257, as indicated by A1 in FIGS. 4B and 4C. Furthermore, should liquid fluid happen to reach the second chamber 257 (for example, if the antenna apparatus 200 were to flip over in a wind and rain storm as seen in FIG. 4B), the fluid channel 406 may facilitate flow of air from the second chamber 257 to the first chamber 256 (as indicated by arrow A1 in FIGS. 4A and 4B) while resisting the flow of liquid fluid from the first chamber 256 to the second chamber 257. Such resistance of liquid fluid flow from the first chamber 256 to the second chamber 257 may be achieved regardless of orientation of the housing assembly 202 relative to earth, for example, as a result of the shape of the fluid channel 406 (e.g., due to the position, orientation, and elongated shape of the fluid channel 406).

To achieve these goals, the fluid channel 406 may include an elongated finger 408 defined by the internal cover 252. The elongated finger 408 may extend from an inner surface of the internal cover 252 (e.g., a surface of the internal cover 252 that faces the lower enclosure 204) away from the inner surface of the internal cover 252 (e.g., the elongated finger 408 may extend towards the lower enclosure 204). The elongated finger 408 may define an inlet 409 located at a first end of the elongated finger 408 (e.g., an end of the elongated finger 408 located nearest to the internal cover 252) and may define an outlet 410 located at a second end of the elongated finger 408 (e.g., an end of the elongated finger 408 located farthest from the internal cover 252). The inlet 409 may be in fluid communication with the second chamber 257 and the outlet 410, and the outlet 410 may be in fluid communication with the first chamber 256 and the inlet 409. In that regard, fluid (such as air) may flow between the first chamber 256 and the second chamber 257 via the inlet 409 and the outlet 410 of the elongated finger 408.

In response to an increase in pressure within the second chamber 257, air may flow from the second chamber 257 into the first chamber 256 via the elongated finger 408. The air may then flow from the first chamber 256 to the ambient environment via the opening 254, as indicated by arrow A2 in FIG. 4C. Likewise, in response to a decrease of pressure within the second chamber 257, air may flow from the first chamber 256 into the second chamber 257 via the elongated finger 408, also indicated by arrow A2 in FIG. 4C. Air may also flow from the ambient environment into the first chamber 256 via the opening 254. Thus, air pressure within the second chamber 257 and the first chamber 256 may equalize with the ambient environment via the elongated finger 408 and the opening 254.

The lower enclosure 204 may define at least one drain hole 412. For example, as shown in FIGS. 4B and 4C, the lower enclosure 204 may define a set of three drain holes 412. The at least one drain hole 412 may be located within the first chamber 256 of the internal region 258. The drain hole 412 may extend from the first chamber 256, through the lower enclosure 204, and into the ambient environment. The drain hole 412 may thus be in fluid communication with the ambient environment and with the first chamber 256. In response to fluid reaching the first chamber 256 (e.g., if the antenna apparatus 200 gets knocked over in a storm and water flows through the opening 254), the drain holes 412 are designed to facilitate flow of the fluid out of the internal chamber 256 and into the ambient environment.

As referenced above, the antenna stack 250 may be partially or entirely located in the second chamber 257. Due to the relatively sensitive components of the antenna stack 250, it may be desirable to reduce or eliminate the ingress of debris or moisture into the second chamber 257. Should fluid, such as water, reach the second chamber 257, the elongated finger 408 is designed to facilitate flow of such fluid from the second chamber 257 into the first chamber 256. For example, the fluid may flow from the inlet 409 (within the second chamber 257) to and out of the outlet 410 (within the first chamber 256). Once the fluid reaches the first chamber 256, it may flow out of the first chamber 256 via the drain holes 412.

Although the elongated finger 408 is in fluid communication between the first chamber 256 and the second chamber 257, the elongated finger 408 is oriented to reduce the likelihood of water flowing from the first chamber 256 to the second chamber 257. This feature may be provided by the location of the outlet 410 relative to the drain holes 412. In particular, the outlet 410 may be located towards the lower enclosure 204 relative to the drain holes 412 by such a distance that the drain holes 412 are sometimes or always located nearer to a ground surface than the outlet 410 in response to inversion of the housing assembly 202. That is, in a configuration in which the antenna stack 250 is located nearer to a ground surface than the lower enclosure 204 (e.g., in response to toppling by winds of a storm), the outlet 410 is located above (i.e., farther from a ground relative to) the drain holes 412. In that regard, in response to toppling of the housing assembly 202, water (e.g., rain) may potentially flow into the first chamber 256 via the opening 254. However, as water fills the first chamber 256, the water may reach the drain holes 412 prior to the outlet 410 regardless of the orientation of the housing assembly 202. Thus, as water continues to flow into the first chamber 256, it reaches the drain holes 412 and flows out of the first chamber 256 before ever reaching the outlet 410. Thus, the orientation of the outlet 410 relative to the drain holes 412 reduces the likelihood of water flowing from the first chamber 256 through the outlet 410 and into the second chamber 257. Accordingly, the housing assembly 202 is designed to resist water ingress into the second chamber 257 (in which at least a portion of the antenna stack 250 is housed) regardless of configuration or orientation of the housing assembly 202 relative to earth.

Mounting System

Figure 5A:
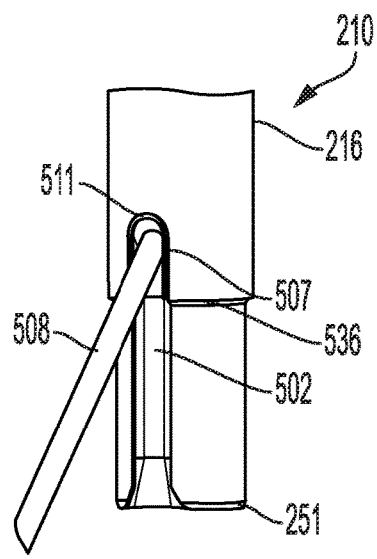
FIG. 5A is an isometric view of a portion of a mast, a bulkhead, and a cable with a corresponding connector in an assembled state in accordance with embodiments of the present disclosure.
Figure 5B:
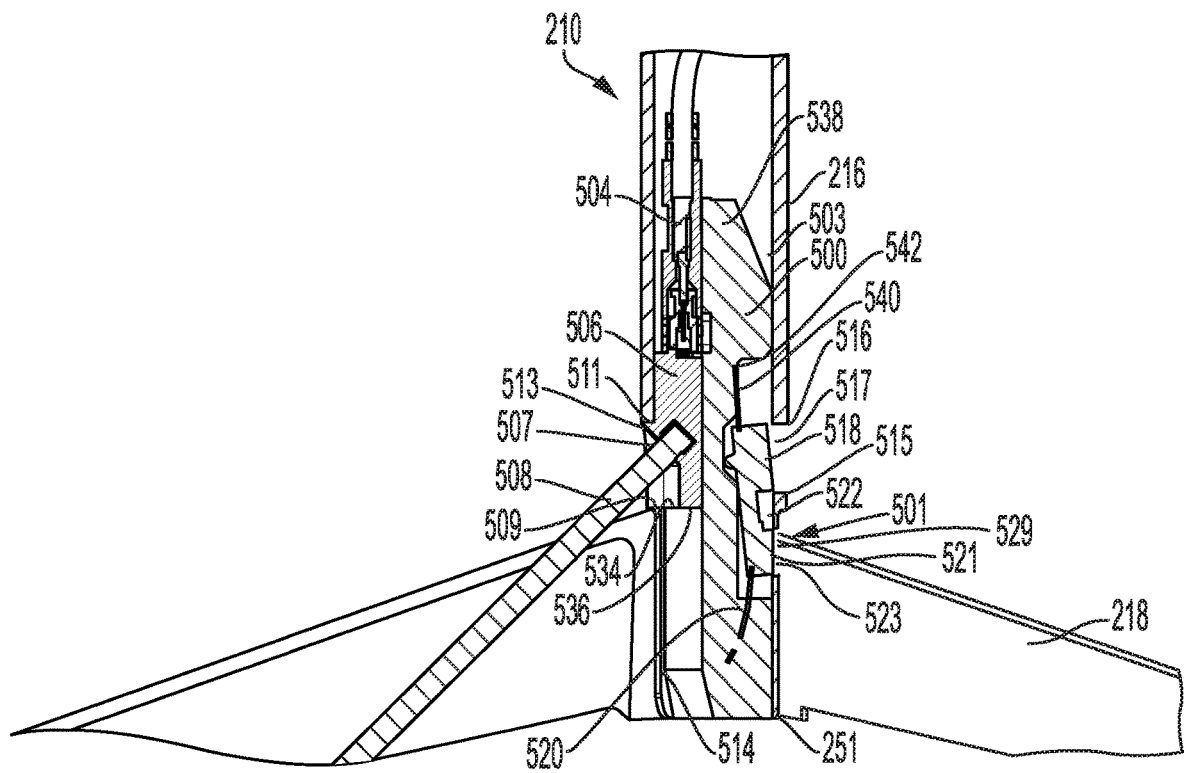
FIG. 5B is a cross-sectional view of the mast, the bulkhead, and the cable and corresponding connector of FIG. 5A along with a mount of the antenna assembly of FIGS. 2A and 2B in accordance with embodiments of the present disclosure.
Figure 5C:
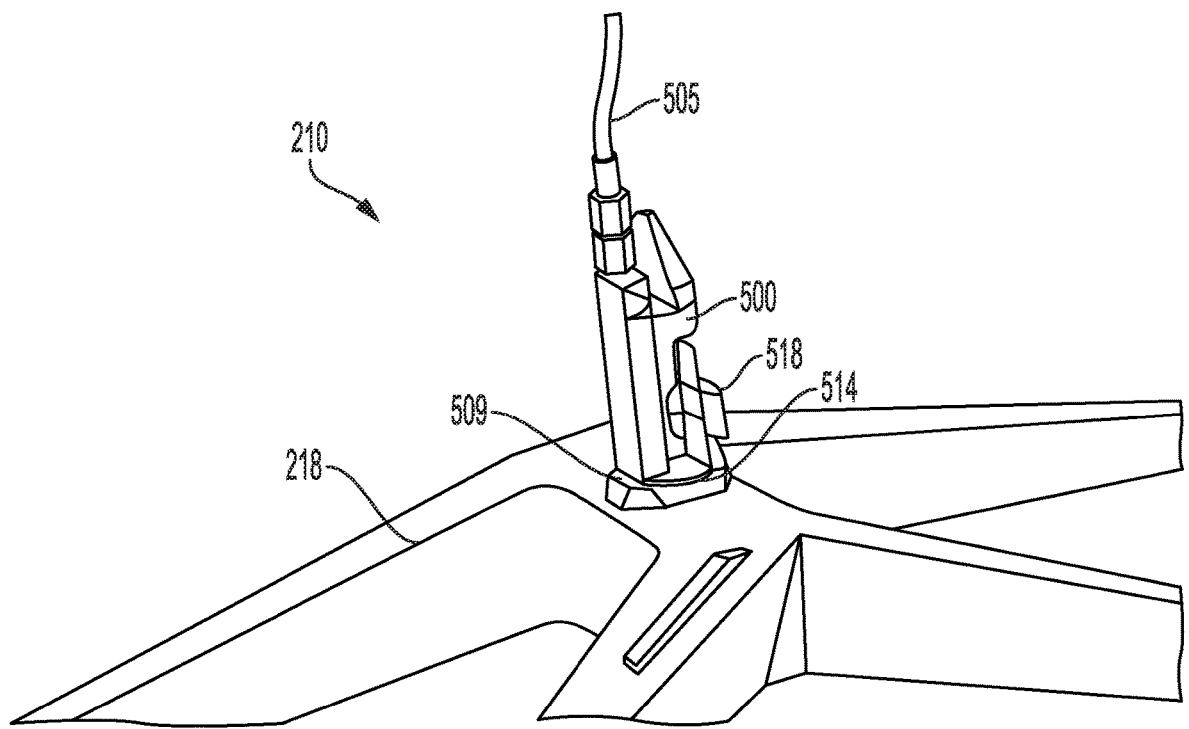
FIG. 5C is an isometric view of the mount with the bulkhead of FIG. 5B installed therein with the mast hidden in accordance with embodiments of the present disclosure.
Figure 5D:
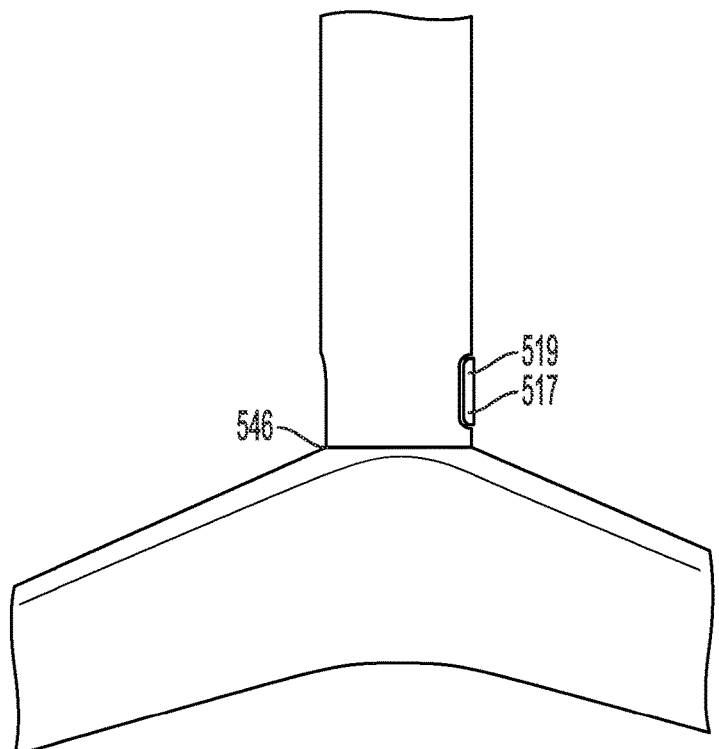
FIG. 5D is an isometric view of the mast, the bulkhead, and the mount of FIG. 5A in an assembled state in accordance with embodiments of the present disclosure.
Figure 6A:
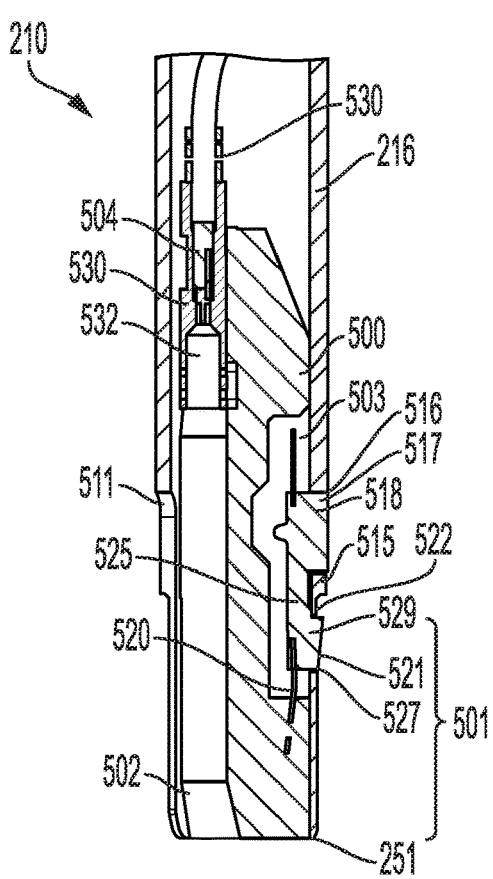
FIG. 6A is a cross-sectional view of a mast and a bulkhead of a mounting system of the antenna assembly of FIGS. 2A and 2B in accordance with embodiments of the present disclosure.
Figure 6B:
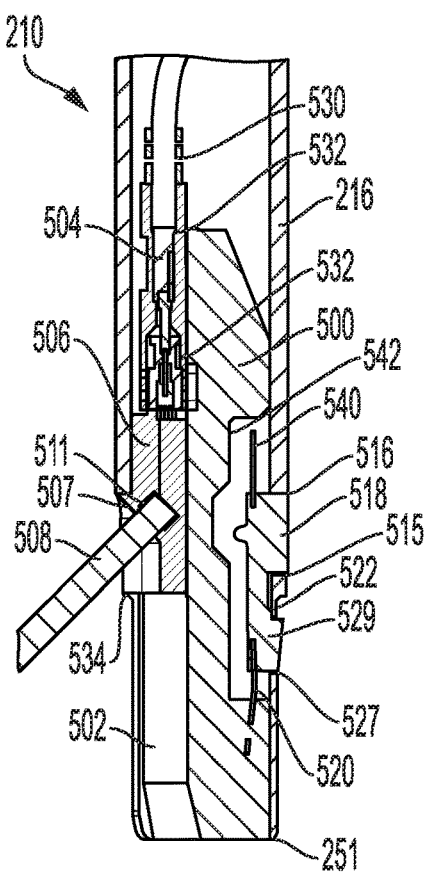
FIG. 6B is a cross-sectional view of the mast and the bulkhead of FIG. 6A along with a cable and corresponding connector of the antenna assembly of FIGS. 2A and 2B in accordance with embodiments of the present disclosure.
Figure 6C:
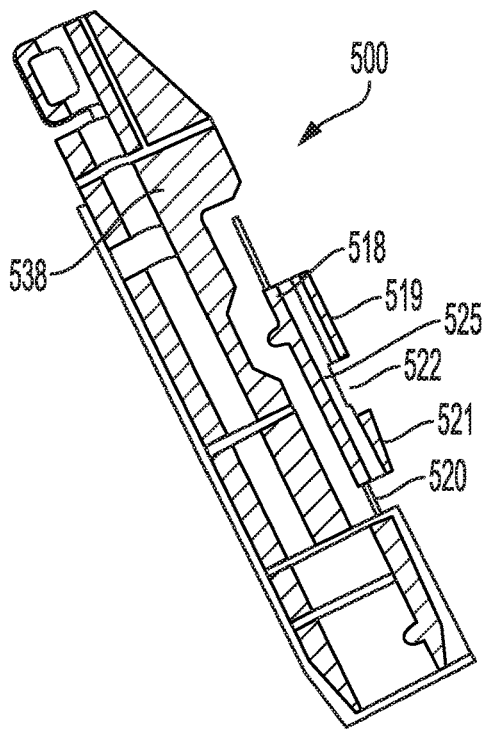
FIG. 6C is a cross-sectional view of the bulkhead of FIG. 6A in accordance with embodiments of the present disclosure.
Figure 6D:
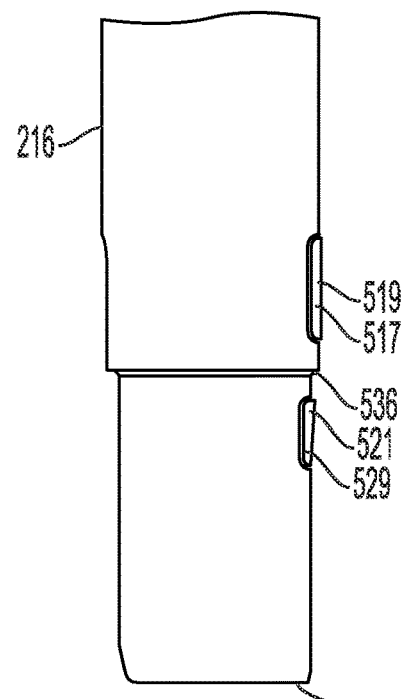
FIG. 6D is an isometric view of the mast and the bulkhead of FIG. 6A in an assembled state in accordance with embodiments of the present disclosure.
Figure 7A:
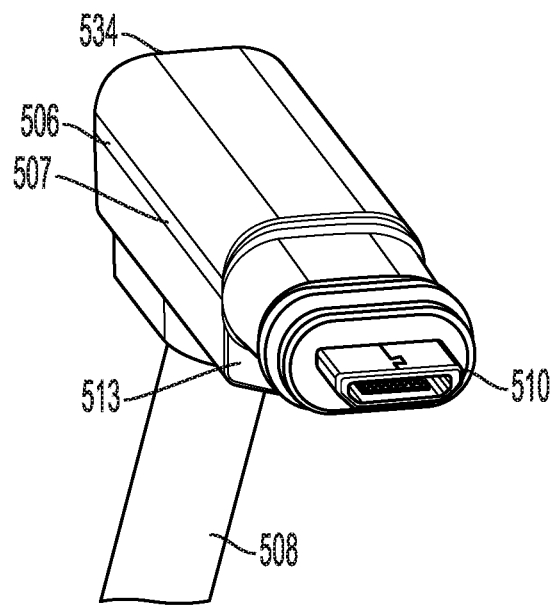
FIG. 7A is an isometric view of a portion of the cable and the corresponding connector of FIG. 5B in accordance with embodiments of the present disclosure.
Figure 7B:
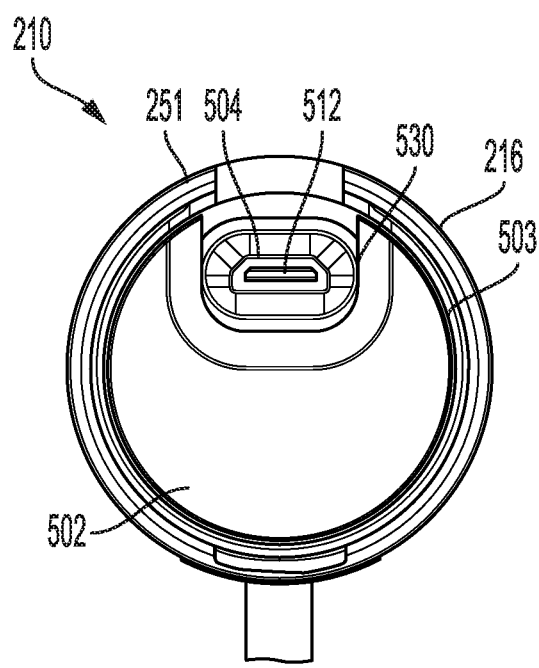
FIG. 7B is a bottom view of the mast of FIG. 5B and an internal connector thereof in accordance with embodiments of the present disclosure.
Figure 7C:
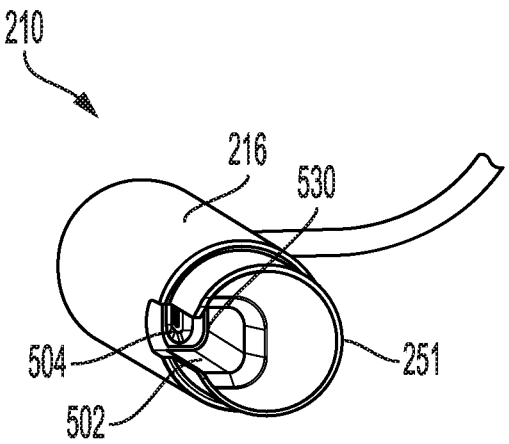
FIG. 7C is an isometric view of the mast of FIG. 7B in accordance with embodiments of the present disclosure.

Referring to FIG. 2B, FIGS. 5A-5D (connection between mast 216 and mount 218), FIGS. 6A-6D (details of bulkhead 500), and FIGS. 7A-7C (details of power connector interface), the mast 216 is designed to be removably coupled to the mount 218, and the two are designed to facilitate a releasable connection of an electrical cable to the antenna assembly 200 to allow for detachment and/or replacement of the electrical cable. The electrical cable may port a power signal, a data signal, or some combination thereof (e.g., may include separate pins or contact points for porting power signals and data signals, or may port a combined power and data signal such as via power over ethernet).

The mast 216 may have a round elongated tubular shape having one or more side walls and an inner bore 503. Referring to FIG. 2B, the second end 253 of the mast 216 couples to the antenna housing assembly 202 and the first end 251 of the mast 216 may be configured to couple to a mount 218. Referring to FIGS. 5A, 5B, 5C, and 5D, the first end 251 of the mast 216 is configured as a received member to nest within a receiver of the mount 218. In the illustrated embodiment, the mast 216 is a circular tube having an outer edge 536 which provides an interface between the mast 216 and the mount 218 as described in greater detail below. In the illustrated embodiment, the outer edge 536 is a circumferential lip; however, in other configurations, the edge 536 may only extend around a portion of the outer circumference of the mast 216.

In some embodiments, the cross-sectional shape of the mast 216 may be triangular, square, rectangular, or any other shape. The mast 216 may define an inner bore 503 having a volume extending from the first end 251 through at least a portion of its length (i.e., along a longitudinal axis thereof). In that regard, the mast 216 may have an annular cross section, which may be present regardless of the shape of the mast 216 (i.e., it may resemble an annular rectangle). In some embodiments, the mast 216 may include multiple tubular or other shaped sections that telescope relative to each other. In such embodiments, a lower telescoping portion may define an internal bore having an inner bore 503 (see FIG. 5A). The bulkhead 500 is designed to be received by the inner bore 503 of the mast 216. The bulkhead 500 may refer to any element designed to be received by the inner bore 503 and to couple the mast 216 to the mount 218.

Referring to FIG. 6C, the bulkhead 500 (or bulkhead connector 500) will now be further described. The bulkhead 500 is designed to be disposed within the mast 216 (e.g., within the inner bore 503) at the first end 251 of the mast 216 to releasably secure the mast 216 to a mount 218 (see, for example, FIGS. 5A, 5B, and 5D; also see, for example, FIG. 5C with the bulkhead 500 connected to the mount 218, but the mast 216 removed). In addition, the bulkhead 500 may be designed as described herein for an additional function: to retain a connector interface of an electrical cable 508 disposed within the mast 216 (compare FIGS. 6A and 6B).

Regarding the releasable connector interface of the electrical cable 508, first and second connector portions 504, 506 may be releasably coupled to one another in the bulkhead 500 (compare FIG. 6B with FIG. 6A, see also FIGS. 7A, 7B, and 7C, as described in greater detail below). The second connector portion 506 is connected to a connecting end of an electrical cable 508, and the first connector portion 504 is disposed on the bulkhead 500 or elsewhere within an inner bore 503 of the mast 216. The first connector portion 504 may be electrically connected to components of at least one of the antenna stack 250 and the actuator 240 to For data and/or power. In that regard, power and/or data electrical signals may be provided to, and received from, the antenna apparatus 200 via a cable 508 (which may port electrical power, data, or a combination thereof) when the first and second connectors portions 504, 506 are coupled to one another.

FIG. 5B illustrates the bulkhead 500 disposed within the inner bore 503 of the mast 216 with the second connector portion 506 and cable 508 attached (compare FIGS. 6A and 6B showing second connector portion 506 and cable 508 detached and attached, respectively). FIGS. 5B and 5D show the bulkhead 500 attached to a mount 218 (also see FIG. 5C with the bulkhead 500 connected to the mount 218, but the mast 216 removed). The mechanism for releasably attaching the mast 216 (with bulkhead 500 disposed within) to the mount 218 will now be described.

As shown, the mast 216 defines or includes a lip 516 and a mast tab 515 that together define or surround a first aperture 517 in a portion of a side wall of the mast 216. The bulkhead 500 may include a biasing portion 518 designed to flex relative to the bulkhead 500 such that, without user manipulation (or other force acting thereon), the biasing portion 518 flexes outwardly to be received by the first aperture 517 (i.e., the biasing portion 518 may have a first position in which it is flexed outwardly, as shown in FIGS. 6A and 6B; the biasing portion 518 may be engaged within the first aperture 517 when in the first position). However, the biasing portion 518 may be pressed by a user (or acted upon by another force, e.g., pressure applied by the mount 218 while the bulkhead 500 and mast 216 are urged into an opening of the mount 218) to flex inwardly to release the connection between the biasing portion 518 and the first aperture 517 (e.g., the biasing portion 518 may have a second position in which it is flexed inwardly, as shown in FIG. 5B; the biasing portion 518 may move relative to the first aperture 517 and the mast 216 when in the second position).

The biasing portion 518 may be made from any material or combination of materials designed to bias and designed to be received by the first aperture 517. In a non-limiting example, the biasing portion 518 includes a spring 520 and a button portion 519 attached thereto. The spring 520 may be made from any suitable materials capable of biasing such as suitable metals and plastics. As seen in FIG. 6C, the spring connects the biasing portion 518 to the main body portion 538 of the bulkhead 500. The button portion 519 may be made from any suitable materials configured for user comfort and ergonomics when pressing.

As further seen in FIGS. 5B and 6B, the biasing portion 518 may include an interference portion 540 (or a stopping interface 540) designed to interface with the main body portion 538. As a non-limiting example, the spring 520 may extend away from the button portion 519 (e.g., further into the mast 216 towards the antenna apparatus 200, see FIG. 3A) and this extension of the spring 520 may form the interference portion 540, and may be designed to interface with a surface 542 on the main body portion 538 of the bulkhead 500. This interface between the interference portion 540 and the surface 542 of the main body portion 538 resists greater flexion of the biasing portion 518 inwardly, which may result in continued contact between the biasing portion 518 and the lip 516. This continued contact may resist movement of the bulkhead 500 further upward into the mast 216.

When flexed outwardly in the first position (see FIG. 6B), an outwardly extending button portion 519 of the biasing portion 518 is designed to fit within the first aperture 517 of the mast 216. In that regard, the button portion 519 is designed to interface with the outer edges of the first aperture 517 (including the lip 516 and the mast tab 515) to resist separation of the bulkhead 500 from the inner bore 503. Stated differently, the interfaces between the button portion 519 and the lip 516, and the button portion 519 and the mast tab 515, resist separation of the bulkhead 500 from the mast 216.

When the button is pressed by a user (see FIG. 5B), the spring 520 is biased to a second position and the button portion 519 is pushed inwardly through the first aperture 517 into the inner bore 503 of the mast 216.

Referring to FIG. 6C, the biasing portion 518 of the bulkhead 500 may further include a bulkhead tab 521 spaced from the button portion 519 (e.g., by a bulkhead notch 522). In some embodiments, the bulkhead tab 521 may be formed integral or monolithic with the biasing portion 518, defining a body portion 525 of the biasing portion 518 including a protruding bulkhead tab 521 and a protruding button portion 519 and further defining a recession therebetween shown as a bulkhead notch 522. The bulkhead notch 522 may receive the mast tab 515 to resist separation of the bulkhead 500 from the mast 216. The bulkhead tab 521 may be spaced from the button portion 519 by a sufficient distance that the mast tab 515 fails to entirely fill the bulkhead notch 522. That is, the mast tab 515 may move slightly between the bulkhead tab 521 and the button portion 519 in response to the bulkhead 500 being coupled to the mast 216.

The bulkhead tab 521 may be configured to align with a second aperture 529 near the first aperture 517 (e.g., defined between the mast tab 515 and an edge 527 of the mast 216). Because the bulkhead tab 521 and the button portion 519 of the biasing portion 518 are coupled to one another and coupled to the main body portion 538 of the bulkhead 500 by a spring 520, when the button portion 519 is pressed by a user (or another force urges the button portion 519 towards a center of the mast 216), both the button portion 519 and the bulkhead tab 521 are biased away from the first aperture 517 and second aperture 529, respectively.

Referring to FIGS. 5A-5C, the mount 218 may define an opening 514 into which the first end 251 of the mast 216 (along with the bulkhead 500 therein) may be received. The opening 514 may have any shape that corresponds to a shape of the mast 216 (at least a lower end, or coupling portion 501, of the mast 216 between the outer lip 536 and the first end 251 may have a shape that corresponds to the shape of the opening 514). For example, the opening 514 may be circular in order to receive the tubular coupling portion 501 of the mast 216. The opening 514 may be defined at a top end of the mount 218. The outer lip 536 of the mast 216 may contact a top surface 546 of the mount 218 to resist movement of the mast 216 into the opening 514 of the mount 218 further than desired.

The mount 218 may include an interface for receiving the mast 216 and releasably engaging with the bulkhead 500 interface mechanism. The mount interface may include an opening 514 designed to receive the first end 251 of the mast 216. The mount 218 may also define a mount receiver 523, which may align with the second aperture 529 of the mast 216. The bulkhead tab 521 may be received by the mount receiver 523 (simultaneously with the bulkhead tab 521 being received by the second aperture 529). Similarly, the mast tab 515 of the mount 218 may be received within the bulkhead notch 522. The interface between the bulkhead tab 521 and the mount receiver 523 may resist separation of the bulkhead 500 from the mount 218. Because the interface of the biasing portion 518 and the first aperture 517 of the mast 216 resists separation of the bulkhead 500 from the mast 216, and the interface between the bulkhead tab 521 and mount receiver 523 resists separation of the bulkhead 500 from the mount 218, these interfaces similarly couple the mast 216 to the mount 218 to resist separation of the mast 216 from the mount 218.

The button portion 519 is designed to extend through the first aperture 517 of the mast 216. In that regard, the button portion 519 may remain exposed in response to the mast 216 and bulkhead 500 being coupled to the mount 218 (see FIG.

5D). The bulkhead tab 521 may be coupled to the button portion 519 and may actuate with the button portion 519. That is, actuation of the button portion 519 may actuate the bulkhead tab in a similar manner. In some embodiments, the bulkhead tab 521 and the button portion 519 may be coupled in another manner and may have any relationship regarding actuation. The button portion 519 and the bulkhead tab 521 may be coupled to the bulkhead 500 via a spring 520. The spring 520 may exert a force on the button portion 519 and the bulkhead tab 521 to urge the button portion 519 at least partially into or through the first aperture 517 of the mast 216, and to simultaneously urge the bulkhead tab 521 at least partially into or through the mount receiver 523 (and the second aperture 529). The spring 520 may also urge a body portion 525 that connects the button portion 519 to the bulkhead tab 521 into the mast tab 515 of the mast 216. In that regard, the mast tab 515 may resist further outward actuation of the button portion 519 and the bulkhead tab 521. Because the spring 520 urges the button portion 519 into the first aperture 517 of the mast 216, and similarly urges the bulkhead tab 521 into the mount receiver 523 (and the second aperture 529), the spring 520 causes the bulkhead 500 to remain coupled to the mast 216 and the mount 218, thus assisting the coupling of these elements (in addition to any additional coupling means such as an interference fit between the mast 216 and mount 218).

As mentioned above, the mast 216 and the mount 218 may be removably coupled together. In order to decouple the mast 216 from the mount, the button portion 519 may be actuated into the inner bore 503 by applying a sufficient force to overcome the force of the spring 520. When the button portion 519 is urged into the inner bore 503, it likewise actuates the bulkhead tab 521 into the inner bore 503, thus removing the bulkhead tab 521 from the mount receiver 523. The mast 216 and bulkhead 500 together may be removed from the mount 218 by forcing these elements apart while the bulkhead tab 521 is removed from the mount receiver 523. In a similar manner, the button portion 519 may be depressed entirely through the first aperture 517 of the mast 216 and the bulkhead 500 may be urged out of the inner bore 503 in order to remove the bulkhead 500 from the mast 216.

It may be desirable for the mast 216 to be retained in the opening 514 of the mount 218 by interference fit. In that regard, a diameter of the first end 251 of the mast 216 may be approximately the same as the diameter of the opening 514 in the mount 218. Approximately may refer to the referenced value plus or minus 10 percent of the referenced value. The interference fit between the mast 216 and the mount 218 may resist movement of the mast 216 relative to the mount 218, particularly in windy or other turbulent environmental conditions.

As shown in FIGS. 5A, 6A, 6B, 7B, and 7C, the annular wall of the mast 216 may include or define a slot 502 which may be located adjacent the body of the bulkhead 500. The slot 502 may extend from the first end 251 of the mast 216 at least partially along a length (i.e., parallel to a longitudinal axis) of the mast 216. The slot 502 may allow radial compression of the annular wall of the mast 216 (i.e., the circumferential ends of the tubular structure defining the mast 216 may be urged towards each other to reduce a diameter of the mast 216), providing for a greater interference fit between the mast 216 and the mount 218 (i.e., the mast 216 may be biased outward so its diameter increases towards its original diameter in response to a lack of compressive force acting thereupon; this outward force may increase the interference between the mast 216 and the mount 218). The slot 502 may be said to provide flexure to the mast 216 to make the mast 216 compliant. In that regard, the slot 502 causes the mast 216 to interfere with the mount 218 to reduce or eliminate slop in the joint between the mast 216 and the mount 218. This lack of slop may result in improved signal to noise ratio (SNR) in signals transmitted and received by the antenna apparatus 200 (shown in FIGS. 2A, 2B, and 3B) in windy conditions. As shown, the slot 502 may have a rounded or circular design. In some embodiments, the slot 502 may have any shape such as squared, triangular, or the like.

As referenced above and referring to 7A-7C, the bulkhead 500 may be designed to retain a connector 506 of a cable 508 within the mast 216. The mast 216 may define a connector cradle 530 within the inner bore 503, for example, at an upper end of the slot 502. In some embodiments, the bulkhead 500 may define the connector cradle 530. The connector cradle 530 is designed to house a connector 504 and may have a shape that corresponds to a shape of the connector 504. For example, the connector 504 may be formed monolithic with the mast 216, may be formed separately from the mast 216 and later installed in the connector cradle 530, may be formed monolithic with the bulkhead 500, may be formed separately from the bulkhead 500 and later coupled to the bulkhead 500, or the like. The connector 504 may be permanently or removably coupled within the connector cradle 530 of the mast 216. For example, the connector 504 may be retained within the connector cradle 530 via an interference fit, via a snap fit connection, via adhesive, or via any other coupling means. In some embodiments, the connector 504 may be a female connector and may thus include a female interface 512 designed to receive a male connector. The connector 504 may be electrically coupled to various components of the antenna assembly 200 of FIGS. 3A and 3B such as the actuator 240, the PCB assembly 380, and the like. For example, a cable or wires 505 may have a first end that is electrically coupled to the connector 504 and a second end or second portion that is electrically coupled to the components of the antenna assembly 200. The electrical coupling between the connector 504 and the components of the antenna assembly 200 may facilitate transmission and/or receipt of at least one of power signals and data signals.

The cable 508 may include the connector 506 at a first, or proximal, end and may be coupled to additional components (such as a router for a home or office network, a power supply, and the like) at another location. The connector 506 of the cable 508 is designed to mate with the connector 504 in the mast 216. In some embodiments, the connector 506 may be a male connector and may thus include a male interface 510. In that regard, mating between the connector 504 and the connector 506 may include an interference fit therebetween to resist separation of the connector 506 from the connector 504. The male interface 510 may mate with the female interface 512 to facilitate transmission and receipt of at least one of power signals and data signals across the connection between the male interface 510 and the female interface 512.

In some embodiments, the male interface 510 and the female interface 512 may be or include commercially available connector types. For example, the interfaces 510, 512 may be universal serial bus (USB)-C type connectors, USB-Mini type connectors, CAT-5 connectors, serial port connectors, or the like. In some embodiments, the interfaces 510, 512 may be or include proprietary connectors designed specifically for use with the antenna apparatus 200 of FIG. 3B. Although designing and manufacturing proprietary connectors may increase difficulty and cost of design and manufacture of the antenna assembly 200, it may be desirable to do so rather than using commercially available connectors so that the connector 506 and cable 508 are not replaced with poorly made versions.

Referring to FIG. 6A, the mast 216 may define or include a connector cavity 532 located adjacent to the connector cradle 530. The connector cavity 532 may receive the connector 506 of the cable 508 and may house the connector 506 while the connector 506 is mated with the connector 504 of the mast 216. In that regard, the connector cavity 532 may have a shape that corresponds to a shape of the connector 506. In some embodiments, the connector cavity 532 may be located upward (i.e., away from the first end 251) from the slot 502 and may be an extension of the slot 502. In that regard and in some embodiments, a portion of the cable 508 may be retained within the slot 502 when the mounting system 210 is fully assembled. In that regard and with brief reference to FIG. 5B, the cable 508 may remain in the slot 502 through the mount 218 for a sleeker look or may be removed from the slot 502 for any reason.

Although an interference fit may exist between the connector 504 and the connector 506 (e.g., via physical shapes of bodies of the connectors 504, 506, via the fit of the male interface 510 into the female interface 512, or the like), it may be desirable for additional forces to retain the connector 506 in place relative to the connector 504. Additional reinforcements may mitigate an unplanned disconnection event between the connectors 504, 506 as the mounting system 210 may be installed in a difficult-to-access location, time-sensitive activities may be occurring over a satellite communication system, and the like. In that regard, the bulkhead 500, mast 216, and mount 218 may together retain the connector 506 in place relative to the connector 504 when the mounting system 210 is fully assembled.

As referenced above, the connector cavity 532 may be an extension of the slot 502, may be aligned with the slot 502, and the like. In some embodiments, the connector cavity 532 may be defined by the mast 216, by the bulkhead 500, by a combination of the mast 216 and the bulkhead 500, and the like. In that regard, a body 507 of the connector 506 may be placed in the slot 502 with the male interface 510 facing towards the connector cradle 530 and the female interface 512. The body 507 may then be urged upward (i.e., towards the female interface 512) until the male interface 510 is received by and in electrical communication with the female interface 512. In some embodiments, at least one of an interference fit between the male interface 510 and the female interface 512, an interference fit between the connector cavity 532 and the body 507, and an interference fit between the connector 504 and the connector 506 (e.g., via connector bodies) may resist separation of the male interface 510 from the female interface 512.

In order to assemble the mounting system 210, the bulkhead 500 may be coupled to the mast 216 by inserting the bulkhead 500 into the inner bore 503 of the mast 216. The bulkhead may be manipulated within the mast 216 until the button portion 519 is aligned with the first aperture 517 of the mast 216. When the button portion 519 is aligned with the aperture 517 (as shown in FIGS. 6A and 6D), the spring 520 will urge the button portion 519 into the first aperture 517 (and the bulkhead tab 521 into the second aperture 529), thus resisting separation or movement of the bulkhead 500 relative to the mast 216.

After the bulkhead 500 is coupled to the mast 216, the connector 506 may be mated with the connector 504 as described above (and as shown in FIG. 6B). The body 507 of the connector 506 may include an edge 513 and at least one of the mast 216 and the bulkhead 500 may define a lip 511. The edge 513 and lip 511 may face each other and may contact each other in response to the connector 506 being coupled to the connector 504. In that regard, the edge 513 and lip 511 may resist further upward movement of the connector body 507 relative to the mast 216, which in turn resists undesirable movement of the first connector 504 further into the inner bore 503.

After the connector 506 is mated with the connector 504 and the bulkhead 500 is retained within the mast 216, the assembled connector 506 (with cable 508), mast 216, and bulkhead 500 may be inserted into the opening 514 of the mount 218 as shown in FIG. 5B (and FIG. 5D). In some embodiments, pressure may be applied to the button portion 519 to cause the bulkhead tab 521 to move inward relative to the mast 216 to allow it to pass into the opening 514 of the mount 218. In some embodiments, the bulkhead tab 521 may be tapered (as shown in FIG. 6B) such that movement of the mast 216 into the opening 514 of the mount 218 urges the bulkhead tab 521 inward and allows the bulkhead tab 521 (along with mast 216 and bulkhead 500) to be received within the opening 514 of the mount 218. The assembled connector 506, mast 216, and bulkhead 500 may be manipulated while in the opening 514 of the mount 218 until the bulkhead tab 521 is aligned with the mount receiver 523. In response to alignment of the bulkhead tab 521 and mount receiver 523, the spring 520 may urge the bulkhead tab 521 to extend through the mount receiver 523. As discussed above, the interface between the bulkhead tab 521 and the mount receiver 523 may retain the bulkhead 500, and thus the mast 216, in place relative to the mount 218.

In response to the bulkhead 500 and mast 216 being retained within the opening 514 of the mount 218 (with the connector 506 mated to the connector 504 within the mast 216), features of the mounting system 210 may be designed to resist separation of the connector 506 from the connector 504. In particular and as discussed above, the lip 511 of the mast 216 (or, in some embodiments, the bulkhead 500) may interface with the edge 513 of the connector body 507 of the connector 506 to resist further upward movement of the connector 506 relative to the mast 216. In a similar manner, the mount 218 may define an edge 509 (which may be part of the top surface 546 or separate from the top surface 546) that faces upward (e.g., towards the mast 216 and connector 506). The connector body 507 may include a bottom surface 534 designed to face the edge 509 of the mount 218. In that regard, the edge 509 of the mount 218 may at least one of face or contact the bottom surface 534 of the connector body 507 to resist downward movement of the connector 506 relative to the mast 216 and mount 218. This interface further resists separation of the connector 506 from the connector 504 (e.g., resists separation or disconnection of the male interface 510 from the female interface 512). In some embodiments, the connector body 507 may be able to move up and down (e.g., along a longitudinal axis of the mast 216) by a tolerance distance. Stated differently, a length of the connector body 507 (from the edge 513 to the bottom surface 534) may be less than a distance from the lip 511 of the mast 216 (or bulkhead 500) to the edge 509 of the mount 218. For example, the tolerance distance may be 0.05 inches (1.27 mm), 0.1 inch (2.54 mm), 0.2 inches (5.08 mm), 0.3 inches (7.62 mm), or the like. However, the tolerance distance may be sufficiently small for the male interface 510 to remain in electrical communication with the female interface 512 regardless of the location of the connector body 507 between the lip 511 of the mast 216 (or bulkhead 500) and the edge 509 of the mount 218. That is, the connector body 507 may move slightly between the lip 511 of the mast 216 and the edge 509 of the mount 218, but electrical communication may remain between the connector 504 and the connector 506 regardless of the position of the connector body 507 between the lip 511 of the mast 216 and the edge 509 of the mount 218.

It may occasionally be desirable to change the cable 508 to a new cable for various reasons (e.g., a portion of the cable 508 gets stripped, the antenna assembly 200 is to be moved to a new location where a shorter or longer cable is desired, or the like). In that regard, the mounting system 210 is designed to allow replacement of the cable 508. To remove the cable, the mast 216, bulkhead 500, and connector body 507 may be removed from the mount 218, as described above (e.g., depressing the button portion 519 and manipulating the mast 216 out of the opening 514). The connector 506 may then be pulled from the connector cavity 532 to remove the connector 506 from the mast 216 and bulkhead 500 (and to disconnect the connector 506 from the connector 504). A new connector of a new cable may then be inserted into the connector cavity 532 and mated with the connector 504, and the mast 216, bulkhead 500, and new connector may be recoupled to the mount 218.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language and language within the specification reciting "at least one of" refers to at least one of a set and indicates that one member of the set or multiple members of the set satisfy the claim. For example, claim language and language within the specification reciting "at least one of A and B" means A, B, or A and B. As another example, claim language and language within the specification reciting "at least one of A or B" means A, B, or A and B.

The embodiments of the invention in which an exclusive property or privilege is claimed are defined as follows:

1. A housing for an antenna assembly, the housing comprising:
    a lower enclosure configured to be coupled to an upper structure to define an internal region; and
    an internal cover configured to be coupled to the lower enclosure to create a first chamber and a second chamber within the internal region, the internal cover including a fluid channel extending from the second chamber to the first chamber, wherein the fluid channel defines an elongated body extending from the internal cover and having an inlet at a first end of the body and an outlet at a second end of the body, and wherein the first chamber is fluidly coupled to the ambient environment.

2. The housing of claim 1, wherein the lower enclosure defines a leg opening configured to receive a leg of a mounting system of the housing, and wherein the leg opening is located within the first chamber.

3. The housing of claim 2, further comprising an actuator configured to be located in the first chamber and to be coupled to the leg, and further configured to actuate in order to adjust an orientation of the housing relative to the leg.

4. The housing of claim 3, further comprising a dust cover configured to be positioned over the leg opening and to be coupled to the leg, and further configured to reduce the likelihood of ingress of debris into the first chamber.

5. The housing of claim 1, wherein the internal cover is sealed to the lower enclosure.

6. The housing of claim 1, wherein the second chamber is configured to house at least one antenna element.

7. The housing of claim 6, wherein the fluid channel is configured to resist liquid fluid flow from the first chamber to the second chamber in all orientations of the housing.

8. The housing of claim 7, wherein the lower enclosure defines drain holes extending from an environment of the lower enclosure into the first chamber.

9. The housing of claim 8, wherein, when the housing is in an inverted position, a distal end of the elongated finger defines an outlet that is located at a height above the drain holes such that liquid fluid entering the first chamber exits the first chamber via the drain holes rather than flowing through the elongated finger into the second chamber.

10. The housing of claim 7, wherein the fluid channel allows for air circulation between the first chamber and the second chamber.

11. The housing of claim 1, further comprising at least one grommet defining a pathway between the first chamber and the second chamber for at least one cable to pass between the first chamber and the second chamber.

12. The housing of claim 1, wherein the housing is configured to house a phased array antenna.

13. A housing for an antenna assembly, the housing comprising:
    an upper structure;
    a lower enclosure configured to be coupled to the upper structure to define an internal region;
    an internal cover configured to be coupled to the lower enclosure to create a first chamber and a second chamber within the internal region; and
    a fluid channel extending from the second chamber to the first chamber, wherein the fluid channel defines an elongated finger having an inlet disposed within the second chamber and at a first end of elongated finger, and an outlet disposed within the first chamber and at a second end of the elongated finger.

14. The housing of claim 13, wherein the lower enclosure defines a leg opening configured to receive a leg of a mounting system of the housing, and wherein the leg opening is located within the first chamber.

15. The housing of claim 14, further comprising an actuator configured to be located in the first chamber and to be coupled to the leg, and further configured to actuate in order to adjust an orientation of the housing relative to the leg.

16. The housing of claim 13, wherein the second chamber is configured to house at least one antenna element, wherein the fluid channel is configured to resist liquid fluid flow from the first chamber to the second chamber in all orientations of the housing.

17. The housing of claim 16, wherein the elongated finger extends away from the upper structure.

18. The housing of claim 16, wherein the lower enclosure defines drain holes extending from an environment of the lower enclosure into the first chamber, and wherein, when the housing is in an inverted position, the outlet is located at a height above the drain holes such that fluid entering the first chamber exits the first chamber via the drain holes rather than flowing through the elongated finger into the second chamber.

19. An internal cover for use with an antenna assembly, the internal cover comprising:
   a perimeter portion configured to be coupled to a lower enclosure to divide an internal region into a first chamber and a second chamber; and
   a fluid channel extending from the second chamber to the first chamber and configured to resist liquid fluid flow from the first chamber to the second chamber in all orientations of the housing, the fluid channel including an elongated finger defined by the internal cover and extending away from the upper structure.

* * * * *